US007156937B2

(12) United States Patent
Provost et al.

(10) Patent No.: US 7,156,937 B2
(45) Date of Patent: Jan. 2, 2007

(54) NEEDLING THROUGH CARRIER SHEETS TO FORM LOOPS

(75) Inventors: George A. Provost, Litchfield, NH (US); William H. Shepard, Amherst, NH (US)

(73) Assignee: Velcro Industries B.V., Curacao (AN)

( * ) Notice: Subject to any disclaimer, the term of this patent is extended or adjusted under 35 U.S.C. 154(b) by 186 days.

(21) Appl. No.: 10/728,138

(22) Filed: Dec. 3, 2003

(65) Prior Publication Data

US 2004/0157036 A1    Aug. 12, 2004

Related U.S. Application Data

(60) Provisional application No. 60/430,731, filed on Dec. 3, 2002.

(51) Int. Cl.
*B32B 37/00* (2006.01)
(52) U.S. Cl. ........................................ 156/148; 156/72
(58) Field of Classification Search ................ 156/148, 156/72
See application file for complete search history.

(56) References Cited

U.S. PATENT DOCUMENTS

| | | |
|---|---|---|
| 3,408,417 A | 10/1968 | Sogawa et al. |
| 3,674,618 A | 7/1972 | Spann |
| 4,116,892 A | 9/1978 | Schwarz |
| 4,154,889 A | 5/1979 | Platt |
| 4,192,086 A | 3/1980 | Sichak |
| 4,223,059 A | 9/1980 | Schwarz |
| 4,258,097 A | 3/1981 | Benedyk |
| 4,295,251 A | 10/1981 | Tatham et al. |
| 4,320,167 A | 3/1982 | Wishman |
| 4,342,802 A | 8/1982 | Pickens, Jr. et al. |
| 4,377,889 A | 3/1983 | Tatham et al. |
| 4,379,189 A | 4/1983 | Platt |
| 4,389,442 A | 6/1983 | Pickens, Jr. et al. |
| 4,391,866 A | 7/1983 | Pickens, Jr. et al. |
| 4,418,104 A | 11/1983 | Kiyomura et al. |
| 4,446,189 A | 5/1984 | Romanek |
| 4,451,314 A | 5/1984 | Knoke et al. |
| 4,490,425 A | 12/1984 | Knoke et al. |
| 4,521,472 A | 6/1985 | Gold |
| 4,536,439 A | 8/1985 | Forsten |
| 4,600,605 A | 7/1986 | Nakai et al. |
| 4,600,618 A | 7/1986 | Raychok, Jr. et al. |

(Continued)

FOREIGN PATENT DOCUMENTS

DE    3006805 A1 *    9/1981

(Continued)

OTHER PUBLICATIONS

Dilo Group, "Market Leadership in Nonwovens Technology", Pakistan Textile Journal, date unknown (2 pages).

(Continued)

*Primary Examiner*—Jeff H. Aftergut
(74) *Attorney, Agent, or Firm*—Fish & Richardson P.C.

(57) ABSTRACT

A loop fastener product is formed by needling a batt of fibers through a carrier sheet such as a plastic film, to form loops on the other side of the carrier sheet. A binder, such as a powder resin or plastic film, is placed over the fiber side of the product and fused to the carrier sheet to bond the fibers in place. In some cases the product is needled in only discrete areas, leaving other areas free of loops. The product may be formed into outer covers for disposable diapers. Fibers of one resin are readily combined with films and backings of other resins to produce particularly thin and low weight loop materials.

92 Claims, 14 Drawing Sheets

U.S. PATENT DOCUMENTS

| | | |
|---|---|---|
| 4,609,581 A | 9/1986 | Ott |
| 4,645,699 A | 2/1987 | Neveu |
| 4,654,246 A | 3/1987 | Provost et al. |
| 4,750,443 A | 6/1988 | Blaustein et al. |
| 4,931,343 A | 6/1990 | Becker et al. |
| 5,032,122 A | 7/1991 | Noel et al. |
| 5,144,730 A | 9/1992 | Dilo |
| 5,216,790 A | 6/1993 | Eschenbach |
| 5,254,194 A | 10/1993 | Ott et al. |
| 5,256,231 A | 10/1993 | Gorman et al. |
| 5,380,580 A | 1/1995 | Rogers et al. |
| 5,391,424 A | 2/1995 | Kolzer |
| 5,407,439 A | 4/1995 | Goulait |
| 5,407,722 A | 4/1995 | Peake, III et al. |
| 5,447,590 A | 9/1995 | Gilpatrick |
| 5,449,530 A | 9/1995 | Peake, III et al. |
| 5,470,417 A | 11/1995 | Goulait |
| 5,500,268 A | 3/1996 | Billarant |
| 5,518,795 A | 5/1996 | Kennedy et al. |
| 5,547,531 A | 8/1996 | Allen et al. |
| 5,571,097 A | 11/1996 | Seth |
| 5,599,601 A | 2/1997 | Polski et al. |
| 5,603,708 A | 2/1997 | Seth |
| 5,605,729 A | 2/1997 | Mody et al. |
| 5,611,789 A | 3/1997 | Seth |
| 5,611,791 A | 3/1997 | Gorman et al. |
| 5,614,232 A | 3/1997 | Torigoe et al. |
| 5,614,281 A | 3/1997 | Jackson et al. |
| 5,615,460 A | 4/1997 | Weirich et al. |
| 5,616,155 A | 4/1997 | Kronzer |
| 5,616,394 A | 4/1997 | Gorman et al. |
| 5,622,578 A | 4/1997 | Thomas |
| 5,654,070 A | 8/1997 | Billarant |
| 5,669,900 A | 9/1997 | Bullwinkel et al. |
| 5,685,756 A | 11/1997 | Noda |
| 5,707,707 A | 1/1998 | Burnes et al. |
| 5,707,906 A | 1/1998 | Eschenbach |
| 5,759,926 A | 6/1998 | Pike et al. |
| 5,763,041 A | 6/1998 | Leak et al. |
| 5,814,390 A | 9/1998 | Stokes et al. |
| 5,843,057 A | 12/1998 | McCormack |
| 5,858,515 A | 1/1999 | Stokes et al. |
| 5,866,222 A | 2/1999 | Seth et al. |
| 5,888,607 A | 3/1999 | Seth et al. |
| 5,891,547 A | 4/1999 | Lawless |
| 5,904,793 A | 5/1999 | Gorman et al. |
| 5,931,823 A | 8/1999 | Stokes et al. |
| 5,945,215 A | 8/1999 | Bersted et al. |
| 5,962,102 A | 10/1999 | Sheffield et al. |
| 5,962,112 A | 10/1999 | Haynes et al. |
| 5,964,742 A | 10/1999 | McCormack et al. |
| 5,997,981 A | 12/1999 | McCormack et al. |
| 6,051,094 A | 4/2000 | Melbye et al. |
| 6,093,665 A | 7/2000 | Sayovitz et al. |
| 6,129,879 A | 10/2000 | Bersted et al. |
| 6,129,964 A | 10/2000 | Seth |
| 6,162,522 A | 12/2000 | Deka et al. |
| 6,195,850 B1 | 3/2001 | Melbye et al. |
| 6,265,053 B1 | 7/2001 | Kronzer et al. |
| 6,329,016 B1 | 12/2001 | Shepard et al. |
| 6,342,285 B1 | 1/2002 | Shepard et al. |
| 6,355,759 B1 | 3/2002 | Sherman et al. |
| 6,368,444 B1 | 4/2002 | Jameson et al. |
| 6,454,989 B1 | 9/2002 | Neely et al. |
| 6,537,935 B1 | 3/2003 | Seth et al. |
| 6,598,276 B1 | 7/2003 | Shepard et al. |
| 6,638,611 B1 | 10/2003 | Seth |
| 6,642,160 B1 | 11/2003 | Takahashi |
| 6,642,429 B1 | 11/2003 | Carter et al. |
| 6,645,611 B1 | 11/2003 | Seth |
| 6,660,202 B1 | 12/2003 | Shepard et al. |
| 6,686,303 B1 | 2/2004 | Haynes et al. |
| 6,703,086 B1 | 3/2004 | Kronzer et al. |
| 6,716,511 B1 | 4/2004 | Bersted et al. |
| 6,756,327 B1 | 6/2004 | Martin |
| 6,783,834 B1 | 8/2004 | Shepard et al. |
| 2004/0020579 A1 | 2/2004 | Durrance et al. |
| 2004/0131820 A1 | 7/2004 | Turner et al. |

FOREIGN PATENT DOCUMENTS

| | | |
|---|---|---|
| DE | 101 39 842 A1 | 4/2003 |
| EP | 0 482 749 A1 | 4/1992 |
| EP | 0 765 616 A1 | 4/1997 |
| EP | 0 780 505 | 6/1997 |
| EP | 0 780 505 A2 | 6/1997 |
| EP | 1279348 A1 * | 1/2003 |
| JP | 06-123061 | 5/1994 |
| JP | 08-27657 | 1/1996 |
| JP | 09-317 A * | 1/1997 |
| JP | 07-171011 A * | 7/1997 |
| JP | 09-195155 | 7/1997 |
| JP | 10-146207 | 6/1998 |
| JP | 10-151005 | 6/1998 |
| WO | WO 98/33410 | 8/1998 |
| WO | WO 99/11452 | 3/1999 |
| WO | WO-01/80680 A1 * | 11/2001 |
| WO | WO03/051251 | 6/2003 |
| WO | WO04/019305 | 3/2004 |
| WO | WO04/049853 | 6/2004 |
| WO | 2004/058118 | 7/2004 |
| WO | 2004/058497 | 7/2004 |
| WO | 2004/059061 | 7/2004 |
| WO | 2004/059117 | 7/2004 |

OTHER PUBLICATIONS

Dilo, "Engineering Excellence in Needle Looms!", Hyperpunch—The Solution for Fine and Quality Fleeces, Synthetic Leather, Spunbondeds, Papermachine Felts!, date unknown (2 pages).

Purdy, Terry, Dilo Inc., Needle Punching Benefits from Elliptical Needle Paths, date unknown (13 pages).

* cited by examiner

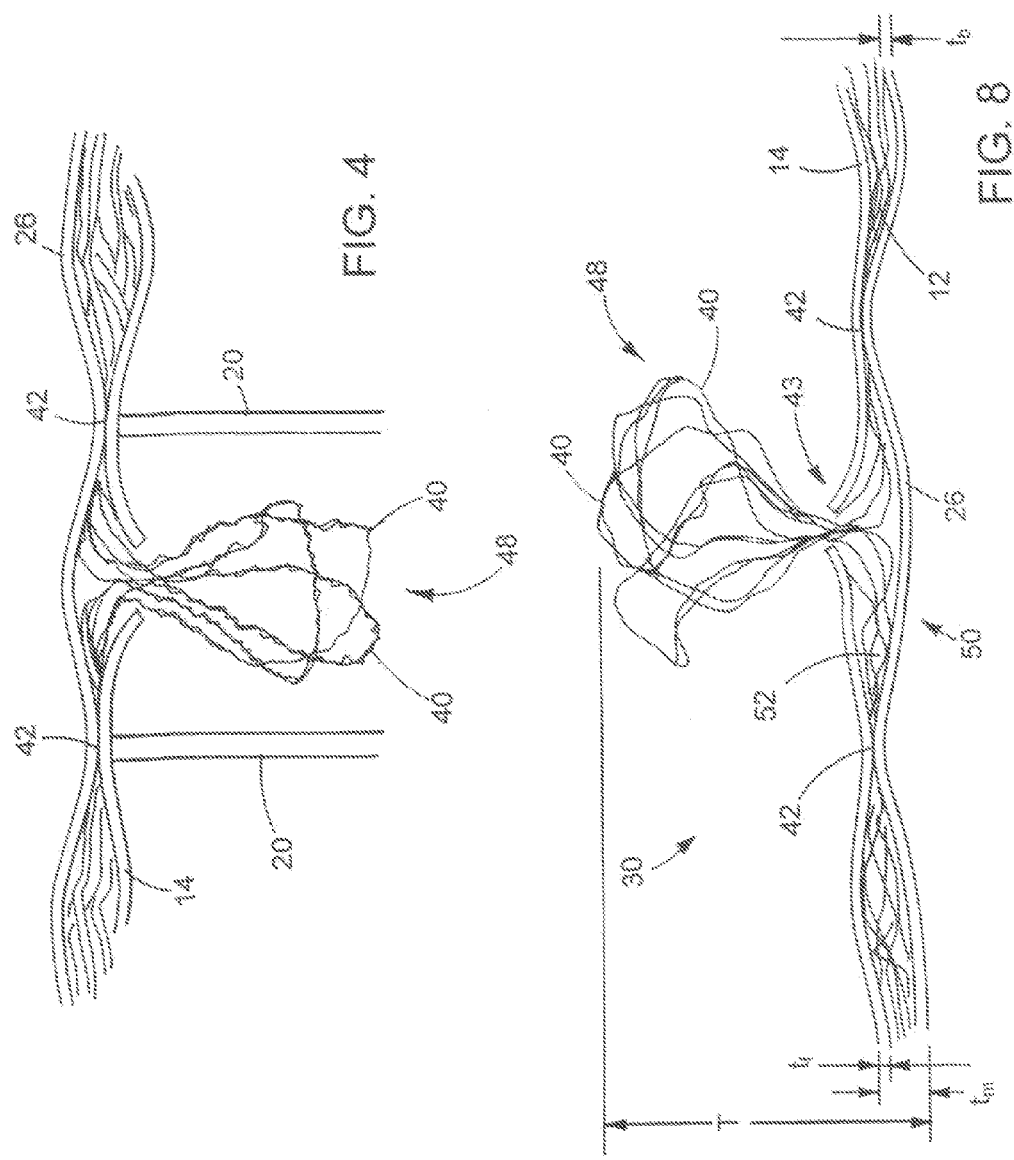

NEEDLING THROUGH CARRIER SHEETS TO FORM LOOPS

CLAIM OF PRIORITY

This application claims priority under 35 USC § 119(e) to U.S. Provisional Patent Application Ser. No. 60/430,731, filed on Dec. 3, 2002, the entire contents of which are hereby incorporated by reference.

TECHNICAL FIELD

This invention relates to methods of making products having loops for hook-and-loop fastening, and products produced by such methods.

BACKGROUND

Touch fasteners are particularly desirable as fastening systems for lightweight, disposable garments, such as diapers. In an effort to provide a cost-effective loop material, some have recommended various alternatives to weaving, such as by needling a lightweight, non-woven batt of fibers. Some such needled batts are then stretched to achieve even lighter basis weight and cost efficiency, with the loop structures anchored by various binding methods. U.S. Pat. No. 6,329,016 teaches one such method, for example.

Reducing fiber content can lower cost, but can also affect overall performance or load-carrying capacity of the loop material, and the dimensional stability and handling efficiency of the loop product. Also, choice of fiber material is often compromised by a need for the loop material to be weld-compatible with a substrate (e.g., an outer layer of a diaper) to which the loop material is to be permanently bonded.

SUMMARY

In several aspects, the invention features a method of making a loop fastener product. The method includes placing a layer of fibers against a first side of a carrier sheet, and then needling fibers of the layer through the carrier sheet by piercing the sheet with needles that drag portions of the fibers through holes formed in the sheet during needling, leaving loops of the fibers extending from the holes on a second side of the carrier sheet. A binder is placed on the fibers on the first side of the pierced sheet, and then fused to the carrier sheet to anchor bases of the loops.

According to one aspect of the invention, a method of making a loop fastener product includes placing a layer of fibers against a first side of a carrier sheet of film, the layer of fibers having an overall density of less than about 5 ounces per square yard and the film having an overall thickness of less than about 0.005 inch. Fibers of the layer are needled through the film by piercing the film with needles that drag portions of the fibers through holes formed in the film during needling, leaving loops of the fibers extending from the holes on a second side of the carrier sheet. The needling density is at least 100 piercings per square centimeter. A binder is placed on the fibers on the first side of the pierced film, and then fused to the film to anchor bases of the loops.

Preferably, the needling density is at least about 200 piercings per square centimeter, more preferably at least about 250 piercings per square centimeter. The needles are preferably forked and of 25 gauge or smaller diameter, more preferably of 35 gauge or smaller diameter. For many applications, the needles penetrate the carrier sheet to a distance of between about 2 and 8 millimeters, preferably between about 3 and 4 millimeters, measured from an entrance side of the sheet. It is generally preferred that the needles pierce the carrier sheet from the first side of the carrier sheet. In some applications the needling density and penetration distances are selected to provide a textured pattern to the loops.

The fiber density is preferably less than about 3 ounces per square yard (100 grams per square meter), more preferably less than about 1.5 ounces per square yard (66 grams per square meter). The fibers are preferably of an average staple length less than about 6 inches (15 centimeters), more preferably less than about 4 inches (10 centimeters), and preferably have a nominal tenacity of at least 3.0 grams per denier. It is presently preferred that the fibers be of between about 2 and 10 denier, such as between about 3 and 6 denier. In some cases, the fibers are crimped.

The film preferably has an overall thickness of less than about 0.003 inch (0.08 millimeter), more preferably less than about 0.002 inch (0.05 millimeter), and in some cases less than about 0.001 inch (0.03 millimeter). In some instances the film is pre-printed with graphics that remain visible from the second side of the carrier sheet after fusing.

In some cases the film forms projections extending out of a general plane of the film at the holes, the projections bearing against fibers passing through the holes.

Some applications include, before placing the fibers against the carrier sheet, carding the layer of fibers. The fibers may also be cross-lapped to form the layer of fibers.

In some embodiments, the fibers comprise a polyester resin. In some other cases, the fibers include a material selected from the group consisting of polyethylenes, polypropylenes, nylons and their co-polymers. The film can also be selected from the same group of polymers. For some applications, the film is preferably a blown polyethylene film. In some instances the fibers are of a resin having a higher melt temperature than resin of the film.

In some embodiments, the carrier sheet, fibers and binder all consist essentially of a single recyclable base resin or of biodegradable materials. For example, the carrier sheet, fibers and binder may consist essentially of polylactic acid to form a biodegradable product, or polypropylene to form a recyclable product.

In some examples the method includes embossing the second side of the carrier sheet, after fusing, to impart a desired pattern to the loops. The pattern may include raised beds of loops surrounded by regions of crushed fibers, for example.

In some embodiments, the binder is in powder form.

In some other cases, the binder comprises a second sheet of film. The binder can be pre-printed with graphics that remain visible from the second side of the carrier sheet after fusing, for some applications. Preferably, the second sheet of film comprises a resin more weld-compatible than resin of the fibers with resin of the carrier sheet. The second sheet of film preferably has an overall thickness of less than about 0.003 inch (0.08 millimeter), more preferably less than about 0.002 inch (0.05 millimeter), and in some cases less than about 0.0005 inch (0.01 millimeter). In some examples the second sheet of film is preheated before being placed on the fibers.

For some applications, the carrier sheet is needled only in selected regions, with other regions of the carrier sheet not needled, to form loops only in the selected regions. In some of these applications, more fibers are placed against the carrier sheet of film in the selected regions than in the other regions. The method includes, in some embodiments, removing fibers from the other regions after needling. In some cases, the binder is applied only to the selected regions of the carrier sheet.

The overall weight of the loop fastener product, including carrier sheet, fibers and fused binder, is preferably less than about 15 ounces per square yard (500 grams per square meter). For some applications, the overall weight is less than about 10 ounces per square yard (330 grams per square meter), or even less than about 5 ounces per square yard (160 grams per square meter), or in some cases, even less than about 2.5 ounces per square yard (85 grams per square meter).

The overall thickness of the fastener product, including carrier sheet, loops and fused binder, is preferably less than about 0.1 inch (2.5 millimeters). For some applications, the overall thickness is less than about 0.05 inch (1.3 millimeters), or even less than about 0.025 inch (0.64 millimeter). Advantageously, the fused binder and carrier sheet can together form a base sheet, from which the loops extend, having an overall thickness of less than about 0.005 inch (0.13 millimeter), or preferably less than about 0.001 inch (0.03 millimeter).

For some applications the carrier sheet comprises a stretchable resin film. The carrier sheet may be needled in a stretched state and then relaxed to densify the loops, for example. In some such cases, the binder is a second sheet of stretchable resin film.

In some cases the carrier film is hyper-needled, such that the needling sufficiently perforates the film that the carrier sheet becomes distendable. A stretchable loop fastener product can thus be formed by using a stretchable material, such as a stretchable resin film, as the binder. In some instances, before fusing, material of the carrier sheet forms generally discrete regions separated by cracks extending between holes punched through the carrier sheet by the needling.

According to another aspect of the invention, a method of making a loop fastener product includes placing a layer of fibers against a first side of a carrier sheet. Fibers of the layer are needled through the carrier sheet by piercing the sheet with needles that drag portions of the fibers through holes formed in the sheet during needling, leaving loops of the fibers extending from the holes on a second side of the carrier sheet. A particulate-form binder is placed on the fibers on the first side of the pierced sheet, particles of the binder entering interstices defined between adjacent fibers near the holes in the carrier sheet. The binder is then fused to the carrier sheet to anchor bases of the loops.

In some embodiments, the binder is in the form of a dry powder, preferably with a nominal particulate size of less than about 20 microns. The binder should include a resin sufficiently compatible with the carrier sheet to form a bond when fused.

In various embodiments, the binder comprises a polyethylene powder, or is selected generally from the group consisting of polyethylenes, polyesters, EVA, polypropylenes, and their co-polymers, in powder form.

For many light-weight applications, the binder is placed on the pierced sheet in a distribution of less than about two ounces per square yard (66 grams per square meter), preferably less than about one ounce per square yard (33 grams per square meter), or even less than about 0.5 ounce per square yard (17 grams per square meter) in some cases.

The binder may consist essentially of loose particles, which can be of irregular shape or generally spherical shape, as examples. In some instances the binder is in the form of a ground powder.

In some embodiments, fusing the binder includes applying heat and pressure to the first side of the pierced sheet. The pressure may be applied by a rotating roller or flatbed laminator, for example.

In some cases, the carrier sheet is a resin film, or a sheet of paper, or a non-woven, woven or knit material.

According to another aspect of the invention, a method of making a loop fastener product includes placing a layer of fibers against a first side of a carrier sheet. With a second side of the carrier sheet against a support bed, fibers of the layer are needled through the carrier sheet by piercing the sheet with needles that drag portions of the fibers through holes formed in the sheet during needling, leaving loops of the fibers extending from the holes into the support bed on a second side of the carrier sheet. A binder is placed on the fibers on the first side of the pierced sheet, and, with the loops extending into the support bed, pressure is applied to the first side of the pierced sheet to fuse the binder to the carrier sheet in regions supported by the support bed.

In some embodiments, the support bed includes a bed of pins, distal ends of the pins contacting the second side of the carrier sheet and the loops extending between adjacent pins. The pin density is preferably at least about 150 pins per square inch (23 pins per square centimeter), more preferably at least about 250 pins per square inch (39 pins per square centimeter) or even 300 or more pins per square inch (47 pins per square centimeter). The pins are preferably of a nominal diameter of between about 0.005 and 0.015 inch (0.13 and 0.38 millimeter), and of a length of at least about 0.1 inch (2.5 millimeters) that is greater than a penetration distance of the needles through the carrier sheet.

In some embodiments, the support bed is a screen contacting the second side of the carrier sheet and the loops extending through openings in the screen. The screen is preferably wire. The wire preferably has a nominal diameter of between about 0.02 and 0.03 inch (0.5 and 0.8 millimeter), more preferably between about 0.023 and 0.028 inch (0.6 and 0.7 millimeter). The wire is preferably metal and more preferably brass. The screen openings preferably have a nominal width of between about 0.05 and 0.2 inch (1.3 and 5.1 millimeter) and, more preferably, have a nominal width of between about 0.06 and 0.1 inch (1.5 and 2.5 millimeter).

In some cases the pressure is applied by a heated surface placed against the binder on the first side of the carrier sheet. The heated surface may be a peripheral surface of a rotating roller, for example. The heated surface is preferably maintained at a temperature high enough, and is held against the binder long enough, to cause the binder to melt in the regions supported by the support bed, without significantly melting resin of the fibers.

According to another aspect of the invention, a method of making a loop fastener product includes placing a layer of fibers against a first side of a carrier sheet. Fibers of the layer are needled through the carrier sheet by piercing the sheet with needles that drag portions of the fibers through holes formed in the sheet during needling, leaving loops of the fibers extending from the holes on a second side of the carrier sheet. The needling sufficiently perforates the carrier sheet that the carrier sheet becomes distendable. A stretchable material is placed on the fibers on the first side of the pierced sheet, and then fused to the carrier sheet to anchor bases of the loops.

In some embodiments the stretchable material comprises a stretchable resin film.

In some instances the carrier sheet comprises a resin film, preferably of a film thickness less than about 0.003 inch (0.08 millimeter).

In some cases, before fusing, material of the carrier sheet forms generally discrete regions separated by cracks extending between holes punched through the carrier sheet by the needling.

Preferably the needling pierces the carrier sheet to a density of at least 250 piercings per square centimeter. The needles are preferably of a diameter of at least about 0.03 inch (0.75 millimeter), and the fiber density is preferably less than about 2 ounces per square yard (66 grams per square meter).

According to another aspect of the invention, a method of making a loop fastener product includes placing a layer of fibers against a first side of a carrier sheet. The fibers are between about 2 and 10 denier. Fibers of the layer are needled through the carrier sheet by piercing the sheet with needles that drag portions of the fibers through holes formed in the sheet during needling, leaving loops of the fibers extending from the holes on a second side of the carrier sheet. The needles penetrate to a maximum distance of less than about 7.0 millimeters from the first side of the carrier sheet and are of a diameter of less than about 0.036 inch (0.9 millimeter). A binder is placed on the fibers on the first side of the pierced sheet, and then fused to the carrier sheet to anchor bases of the loops.

Preferably, the needling pierces the carrier sheet to a density of at least 200 piercings per square centimeter. The fiber density is preferably less than about 3 ounces per square yard (100 grams per square meter), more preferably less than about 1.5 ounces per square yard (66 grams per square meter). The carrier sheet preferably has a nominal thickness of less than about 0.003 inch (0.08 millimeter), or even less than about 0.002 inch (0.05 millimeter). The fibers preferably have a nominal tenacity of at least 3.0 grams per denier, and are of between about 3 and 6 denier.

In some cases the carrier sheet comprises a polymer film. Ideally, the film forms projections extending out of a general plane of the film at the holes, the projections bearing against fibers passing through the holes. The film can be a blown polyethylene film, for example.

Preferably the fibers are of a resin having a higher melt temperature than resin of the film. The fibers may comprise a polyester resin, or may be of a material selected from the group consisting of polyethylenes, polypropylenes, nylons and their co-polymers.

The needles preferably penetrate to a maximum distance of between about 3 and 4 millimeters from the first side of the carrier sheet.

In some preferred embodiments, the binder comprises a sheet of film. The binder can be advantageously pre-printed with graphics that remain visible from the second side of the carrier sheet after fusing. Preferably, the sheet of film comprises a resin more weld-compatible than resin of the fibers with resin of the carrier sheet, and has an overall thickness of less than about 0.003 inch (0.08 millimeter), or even less than about 0.002 inch (0.05 millimeter). In some cases the method includes preheating the sheet of film before placing the binder on the fibers.

The overall weight of the loop fastener product, including carrier sheet, fibers and fused binder, is preferably less than about 15 ounces per square yard (500 grams per square meter). The overall thickness of the fastener product, including carrier sheet, loops and fused binder, is preferably less than about 0.1 inch (2.5 millimeters). In many instances the fused binder, carrier sheet together form a base sheet, from which the loops extend, having an overall thickness of less than about 0.005 inch (0.13 millimeter).

According to another aspect of the invention, a method of providing hook-engageable loops in selected regions on a carrier sheet includes placing a layer of fibers against a first side of a carrier sheet. Fibers of the layer are needled through the carrier sheet in selected regions by piercing the sheet with needles that drag portions of the fibers through holes formed in the selected regions of the sheet during needling, leaving loops of the fibers extending from the holes on a second side of the carrier sheet. A binder is placed on the fibers on the first side of the pierced sheet in the selected regions, and then fused to the carrier sheet to anchor bases of the loops.

Preferably, the binder has an overall thickness of less than about 0.003 inch (0.08 millimeter). The needling preferably pierces the carrier sheet to a density of at least 200 piercings per square centimeter. The fiber density is preferably less than about 3 ounces per square yard (100 grams per square meter). The carrier sheet preferably has a nominal thickness of less than about 0.003 inch (0.08 millimeter), or even less than about 0.002 inch (0.05 millimeter). The fibers preferably have a nominal tenacity of at least 3.0 grams per denier, and are of between about 3 and 6 denier.

In some embodiments, the binder is in the form of a liquid-impermeable sheet that covers the fibers and holes to form a barrier to liquid passing through the holes formed in the carrier sheet by the needling. In some cases the liquid-impermeable sheet is in the form of discrete sheet portions placed against the selected regions, with the other regions not covered by the binder.

In some cases, the binder is pre-printed with graphics that remain visible from the second side of the carrier sheet after fusing In some instances, the binder is in the form of a dry powder, or is in liquid form.

In some examples, the carrier sheet is needled while a second side of the carrier sheet against a support bed, with the binder placed on the carrier sheet while the loops extend from the holes into the support bed.

Some examples includes, after fusing, severing the carrier sheet to form discrete sheet products, each sheet product having at least one region with loops and another region free of loops. In some cases the discrete sheet portions are formed into outer layers of disposable garments such as diapers, the region with loops arranged to be releasably engaged by male touch fastener elements for securing the garment about a wearer.

In some embodiments the carrier sheet comprises a polymer film. The film preferably forms projections extending out of a general plane of the film at the holes, the projections bearing against fibers passing through the holes.

The overall weight of the loop fastener product, including carrier sheet, fibers and fused binder, is preferably less than about 15 ounces per square yard (500 grams per square meter). The overall thickness of the fastener product, including carrier sheet, loops and fused binder, is preferably less than about 0.1 inch (2.5 millimeters). In many instances the fused binder, carrier sheet together form a base sheet, from which the loops extend, having an overall thickness of less than about 0.005 inch (0.13 millimeter).

According to another aspect of the invention, a loop fastener product has a layer of fibers, a carrier sheet of film, and a binder. The layer of fibers, placed against a first side of a carrier sheet of film, has an overall density of less than about 5 ounces per square yard. The film has an overall thickness of less than about 0.005 inch (0.1 millimeter) and contains at least 100 piercing holes per square centimeter. Loops of the fibers extend from the piercing holes on a second side of the carrier sheet. The binder is placed on the fibers on the first side of the pierced film wherein the binder is fused to the film to anchor bases of the loops.

The fiber density is preferably less than about 3 ounces per square yard (100 grams per square meter), more preferably less than about 1.5 ounces per square yard (66 grams per square meter). The fibers are preferably of an average staple length less than about 6 inches (15 centimeters), more preferably less than about 4 inches (10 centimeters), and preferably have a nominal tenacity of at least 3.0 grams per denier. It is presently preferred that the fibers be of between about 2 and 10 denier, such as between about 3 and 6 denier. In some cases, the fibers are crimped. In some cases, the fibers are carded and cross-lapped to form the layer of fibers.

The film preferably has a nominal thickness of less than about 0.003 inch (0.08 millimeter), more preferably less than about 0.002 inch (0.05 millimeter), or even more preferably less than about 0.001 inch (0.03 millimeter). Preferably, there are at least 200 piercing holes per square centimeter in the film, more preferably at least 250 piercing holes per square centimeter. In some instances the film is pre-printed with graphics that remain visible from the second side of the carrier sheet after fusing.

In some cases, the film forms projections extending out of a general plane of the film at the holes, the projections bearing against fibers passing through the holes.

The loops preferably extend between about 2 and 8 millimeters, measured from a first side of the sheet. More preferably, the loops extend between about 3 and 4 millimeters. The loop extension distances and density of piercing holes can be selected to provide a textured pattern to the loops.

In some embodiments, the fibers comprise a polyester resin. In some other cases, the fibers include a material selected from the group consisting of polyethylenes, polypropylenes, nylons, and their co-polymers. The film can also be selected from the same group of polymers. For some applications, the film is preferably a blown polyethylene film. In some instances, the fibers are of a resin have a higher melt temperature than resin of the film.

In some embodiments, the carrier sheet, fibers, and binder all consist essentially of a single recyclable base resin or of biodegradable materials. For example, the carrier sheet, fibers and binder may consist essentially of polylactic acid to form a biodegradable product, or polypropylene to form a recyclable product.

In some examples, the second side of the carrier sheet is embossed to impart a desired pattern to the loops. The pattern may include raised beds of loops surrounded by regions of crushed fibers, for example.

In some embodiments, the binder is in powder form.

In some other cases, the binder comprises a second sheet of film. The binder can be pre-printed with graphics that remain visible from the second side of the carrier sheet after fusing, for some applications. Preferably, the second sheet of film comprises a resin more weld-compatible than resin of the fibers with resin of the carrier sheet. The second sheet of film preferably has an overall thickness of less than about 0.003 inch (0.08 millimeter). In some examples the second sheet of film is preheated before being placed on the fibers.

For some applications, the carrier sheet only has piercing holes in selected regions, with other regions of the carrier sheet not having piercing holes, to form loops only in the selected regions. In some of these applications, more fibers are placed against the carrier sheet of film in the selected regions than in the other regions. In some cases, the binder is applied only to the selected regions of the carrier sheet.

The overall weight of the loop fastener product, including carrier sheet, fibers and fused binder, is preferably less than about 15 ounces per square yard (500 grams per square meter). For some applications, the overall weight is less than about 10 ounces per square yard (330 grams per square meter), or even less than about 5 ounces per square yard (160 grams per square meter).

The overall thickness of the fastener product, including carrier sheet, loops and fused binder, is preferably less than about 0.1 inch (2.5 millimeters). For some applications, the overall thickness is less than about 0.05 inch (1.3 millimeters), or even less than about 0.025 inch (0.64 millimeter). Advantageously, the fused binder and carrier sheet can together form a base sheet, from which the loops extend, having an overall thickness of less than about 0.005 inch (0.13 millimeter), or preferably less than about 0.001 inch (0.03 millimeter).

For some applications, the carrier sheet comprises a stretchable resin film. The carrier sheet may be needled in a stretched state and then relaxed to densify the loops, for example. In some such cases, the binder is a second sheet of stretchable resin film.

In some cases, the carrier film is hyper-needled, such that the needling sufficiently perforates the film that the carrier sheet becomes distendable. A stretchable loop fastener product can thus be formed by using a stretchable material, such as a stretchable resin film, as the binder. In some instances, material of the carrier sheet forms generally discrete regions separated by cracks extending between holes punched through the carrier sheet by the needling. Some other aspects of the invention feature products, including loop products, rolls of loop-bearing material, and individual loop-bearing garments, produced by the above-described methods. Some other aspects feature apparatus for performing the above-described methods, either in a continuous or batch process.

Various aspects of the invention can provide a loop material that can withstand particularly high shear and peel loads for its weight and cost, especially when combined with appropriately sized male fastener elements. Because the tensile strength of the base of the fastener product is derived at least in part from the carrier sheet (or, in cases where the binder is a sheet product, from the binder sheet), there only need be sufficient fibers to generate the anchored loop structures, enabling a reduction in requirements for high-tenacity fiber. The binder can be selected of a material not necessarily weld-compatible with the fiber material, as the loop structures can be anchored by fusing the binder directly to the carrier sheet to encapsulate portions of the fibers and mechanically anchor the bases of the loop structures. This can enable the use of fiber materials preferred for their fastening performance, with binders selected for compatibility with a substrate in a given application.

The invention can provide loop materials containing surprisingly low basis weights of fiber, and low overall weight and thickness, particularly suitable for low-cycle, disposable products and applications.

The use of powdered, or otherwise loose particulate-form binders can reduce the overall weight of binder needed to secure the loop structures, as the binder can penetrate between the fibers and into base regions of the loop structures near the holes of the carrier sheet prior to fusing. Vibration of the powdered fibers prior to fusing can enhance this penetration.

The invention can provide a cost-effective means for providing engageable loops on an otherwise loop-free carrier sheet, by selective needling. Such carrier sheets can then be processed into substrates for given applications, such as into outer membranes of disposable diapers. This can eliminate a step of bonding a loop material to the substrate in the production of such products, the partially loop-carrying material becoming the substrate.

The invention can, in various aspects, also provide a cost-effective stretchable loop product.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 4 shows the needled film spot-laminated with a backing material.

FIG. 8 illustrates the structure of the finished loop product.

Like reference symbols in the various drawings indicate like elements.

DETAILED DESCRIPTION

Figure 1:
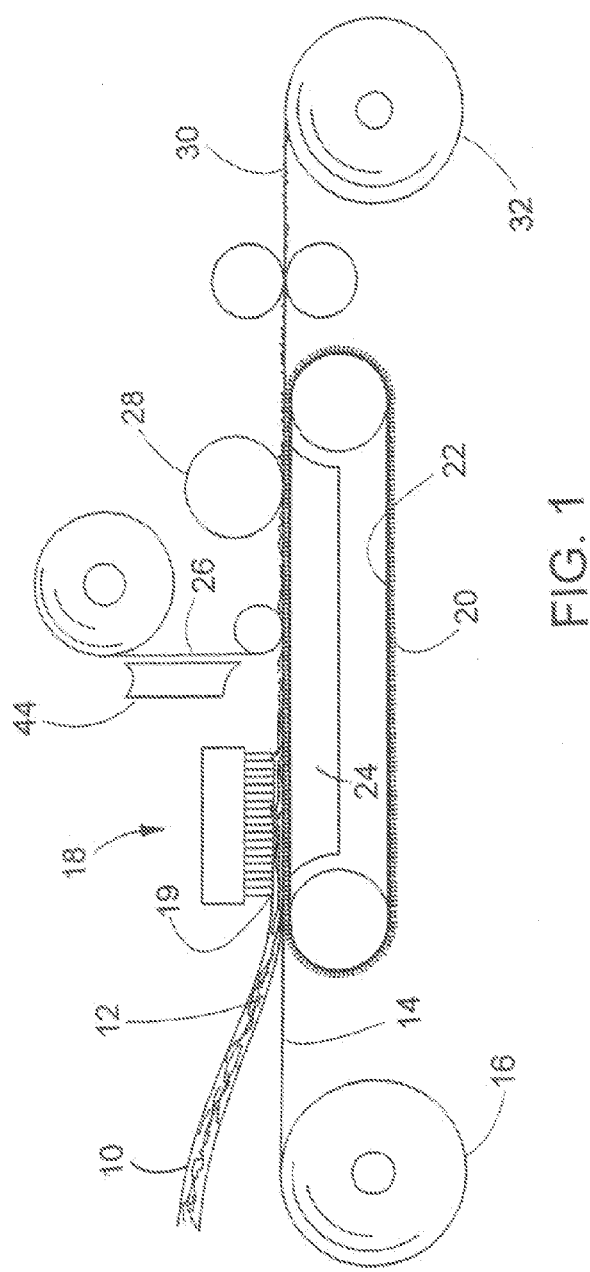
FIG. 1 shows a process for forming loops on a carrier web by needling and bonding.
Figure 2A:
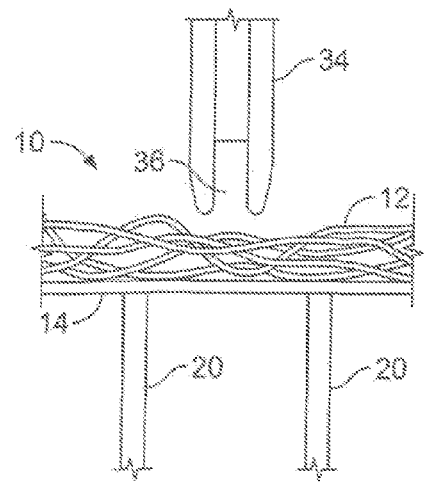
FIGS. 2A–2D sequentially illustrate needling fibers through a carrier film supported by pins.
Figure 2B:
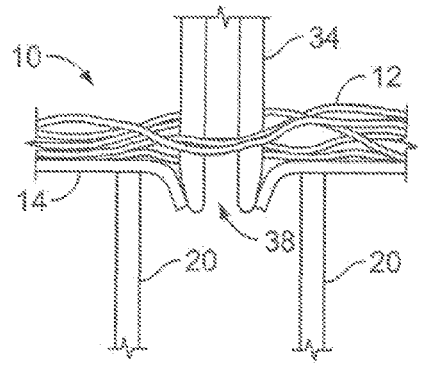
Figure 2C:
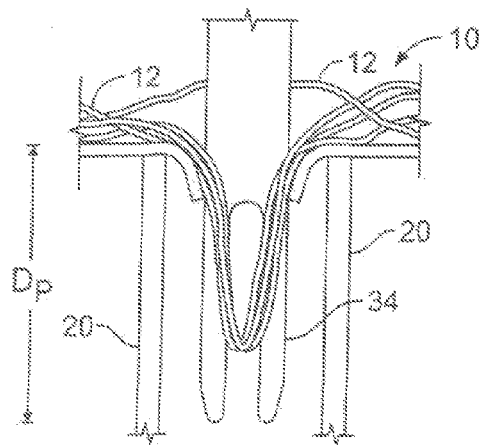
Figure 2D:
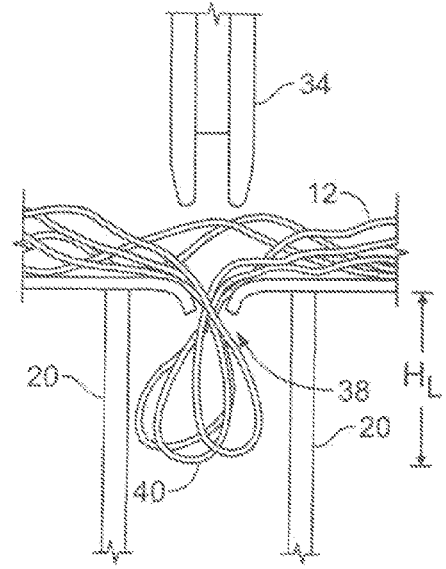
Figure 3A:
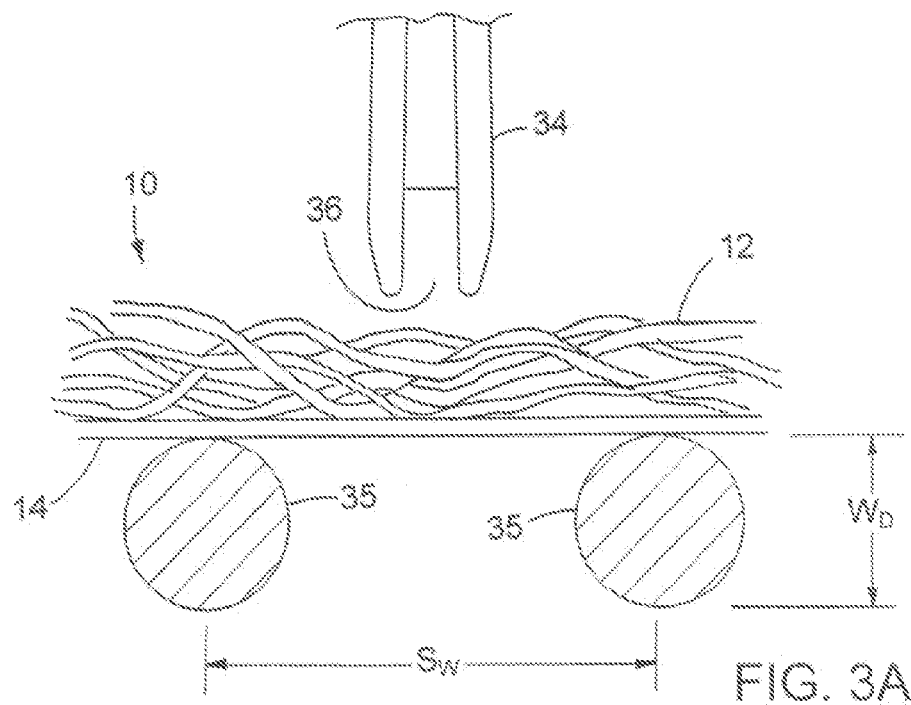
FIGS. 3A–3D sequentially illustrate needling fibers through a carrier film supported by a screen.
Figure 3B:
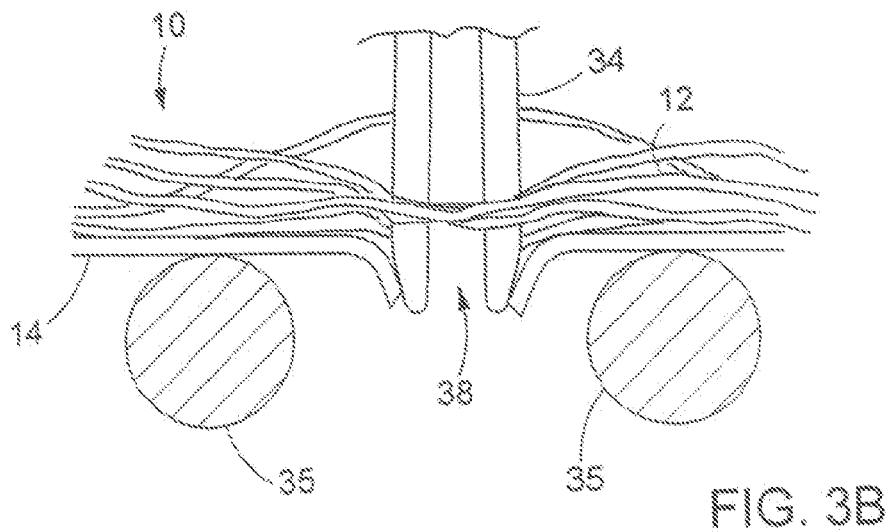
Figure 3C:
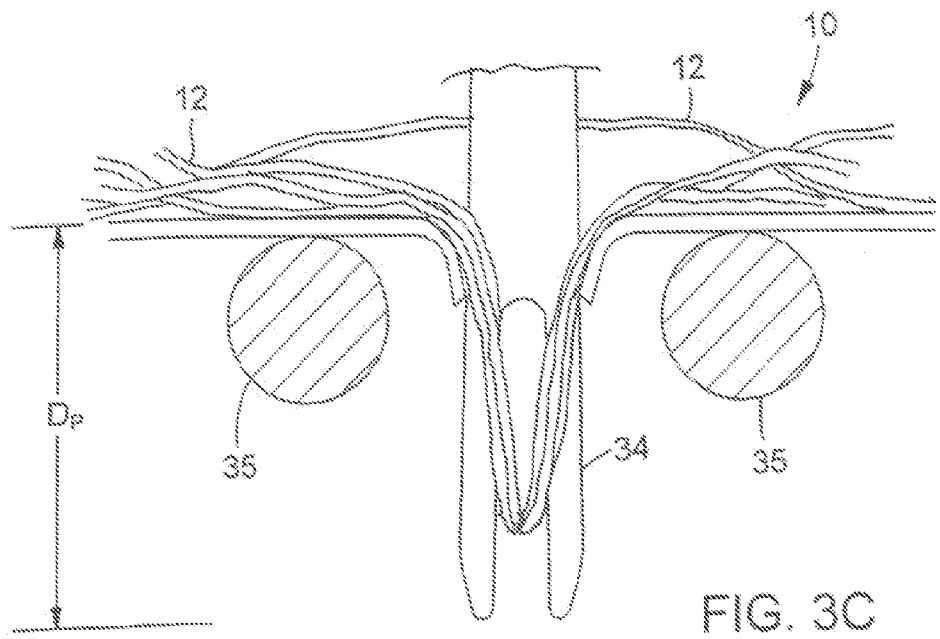
Figure 3D:
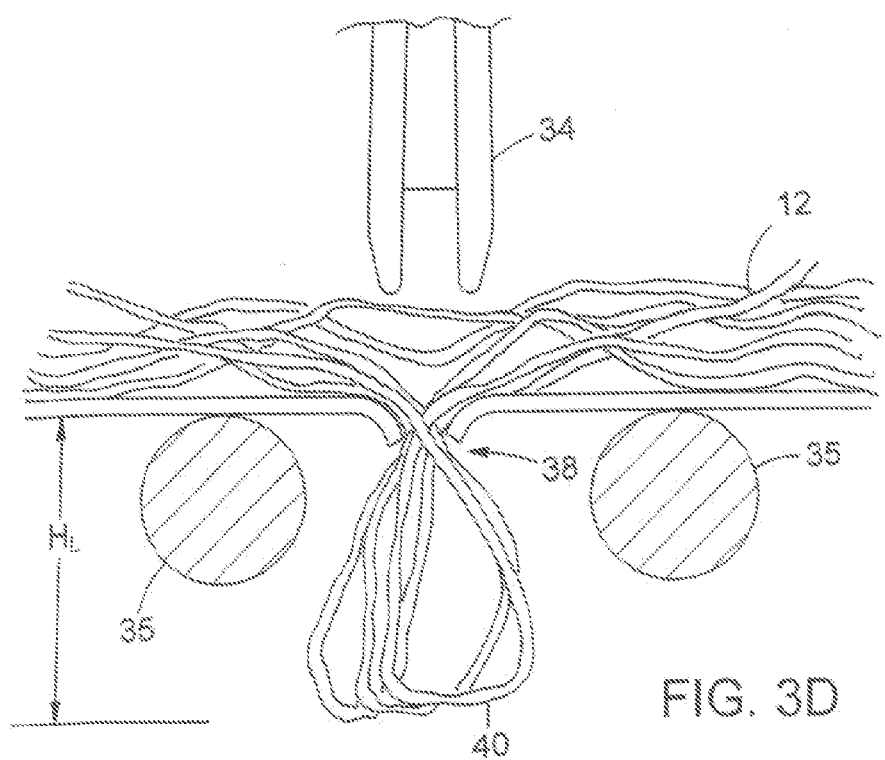

Referring first to FIG. 1, a carded batt 10 of fibers 12 is laid upon a continuous sheet of film 14 as it unwinds from spool 16. The fibers 12 and film 14 are then fed into a needling station 18, where the film is needle-punched from the fiber side. The needles are guided through a stripping plate 19 above the fibers, and draw fibers through the film to form loops on the opposite side of the film. During needling, the film is supported on a bed of pins 20 extending from a driven support belt 22 that moves with the film through the needling station, a screen, or by a standard stitching plate (not shown). Reaction pressure during needling is provided by a stationary reaction plate 24 underlying belt 22. After needling, and with the film still carried on the bed of pins 20, a backing film 26 is laid over the fiber side of film 14 and the two film sheets are bonded together under pressure by heated roller 28, pressing against pins 20. After bonding, the completed loop product 30 is spooled onto spool 32.

We have found that a useful loop product may thus be formed with relatively little fiber 12. In this example, batt 10 has a basis weight of only about 1.0 ounce per square yard (33 grams per square meter). Fibers 12 are drawn and crimped polyester fibers, 3 to 6 denier, of about a three-inch (7.5 centimeters) staple length. Fibers with tenacity values of at least 2.8 grams per denier have been found to provide good closure performance, and fibers with a tenacity of at least 5 or more grams per denier (preferably even 8 or more grams per denier) are even more preferred in many instances. In general terms for a loop-limited closure, the higher the loop tenacity, the stronger the closure. The fibers of batt 10 are in a drawn, molecular oriented state, having been drawn with a draw ratio of at least 2:1 (i.e., to at least twice their original length) under cooling conditions that enable molecular orientation to occur, to provide a fiber tenacity of about 4.8 grams per denier. The fibers in this example are of round cross-section and are crimped at about 7.5 crimps per inch (3 crimps per centimeter). Such fibers are available from E.I. Du Pont de Nemours & Co., Inc., in Wilmington, Del. under the designation T-3367 PE T-794W 6×4. The loop fiber denier should be chosen with the hook size in mind, with lower denier fibers typically selected for use with smaller hooks. For low-cycle applications for use with larger hooks (and therefore preferably larger diameter loop fibers), fibers of lower tenacity or larger diameter may be employed. As an alternative to round cross-section fibers, fibers of other cross-sections having angular surface aspects, e.g. fibers of pentagon or pentalobal cross-section, can enhance knot formation during needling.

Various synthetic or natural fibers may be employed. In some applications, wool and cotton may provide sufficient fiber strength. Presently, thermoplastic staple fibers which have substantial tenacity are preferred for making thin, low-cost loop product that has good closure performance when paired with very small molded hooks. For example, polyolefins (e.g., polypropylene or polyethylene), polyesters (e.g., polyethylene terephthalate), polyamides (e.g., nylon), acrylics and mixtures, alloys, copolymers and co-extrusions thereof are suitable. Polyester is presently preferred. For a product having some electrical conductivity, a small percentage of metal fibers may be added. For instance, loop products of up to about 5 to 10 percent fine metal fiber, for example, may be advantageously employed for grounding or other electrical applications.

The batt 10 may be cross-lapped prior to introduction to film 14. In this case, the carding machines (not shown) card the staple fibers to produce carded webs of fibers 12 which are picked up by the take-off aprons of cross-lappers (not shown). The cross-lappers may have lapper aprons that traverse a floor apron in a reciprocating motion. The cross-lappers lay carded webs of, for example, about 60 inches (1.5 meters) width and about one inch (2.5 centimeters) thickness on the floor apron, to build up several layers of criss-crossed web to form a batt of, for instance, about 90 to 120 inches (2.3 to 3.0 meters) in width and about 4 inches (10 centimeters) in thickness. During carding, the material is stretched and pulled into a cloth-like mat consisting primarily of parallel fibers. With nearly all of its fibers extending in the carding direction, the mat has some strength when pulled in the carding direction but almost no strength when pulled in the carding cross direction, as cross direction strength results only from a few entanglements between fibers. During crosslapping, the carded fiber mat is laid in an overlapping zigzag pattern, creating batt 10 of multiple layers of alternating diagonal fibers. The diagonal layers, which extend in the carding cross direction, extend more across the apron than they extend along its length. For instance, we have used batt which has been crosslapped to form layers extending at anywhere from about 6 to 18 degrees from the cross direction of the finished product. The material properties and the manufacturing process can be affected by the crosslapping angle. In preparation for needling, batt 10 is gradually compressed in a tapered nip between a floor apron (not shown) and a moving overhead apron (not shown) to reduce its thickness to about one inch. A relatively thin, low-density batt can thus be produced.

In this example, batt 10 is laid upon a blown polyethylene film 14, such as is available for bag-making and other packaging applications. Film 14 has a thickness of about 0.002 inch (0.05 millimeter). Even thinner films may be employed, with good results. Other carrier web materials may be substituted for film 14 for particular applications. For example, fibers may be needle-punched into paper, or into lightweight cotton sheets.

In this example, needling station 18 needles the fiber-covered film 14 with an overall penetration density of about 250 punches per square centimeter. At this needling density and with this film thickness, we found that 38 gauge forked tufting needles were small enough to not obliterate the film, leaving sufficient film interconnectivity that the film continued to exhibit some dimensional stability within its plane. With the same parameters, larger 30 gauge needles essentially segmented the film into small, discrete pieces entangled within the fibers.

FIGS. 2A through 2D sequentially illustrate the formation of a loop structure by needling. As forked needle enters the fiber batt 10 (FIG. 2A), some individual fibers 12 will be captured in the cavity 36 in the forked end of the needle. As needle 34 pierces film 14 (FIG. 2B), these captured fibers 12 are drawn with the needle through the hole 38 formed in the film to the other side of the film. As shown, film 14 remains generally supported by pins 20 through this process, the penetrating needle 34 entering a space between adjacent pins. Alternatively, film 14 can be supported by a screen or stitching plate (not shown) that defines holes aligned with the needles. As needle 34 continues to penetrate (FIG. 2C), tension is applied to the captured fibers, drawing batt 10 down against film 14. In this example, a total penetration depth "$D_P$" of about 3.5 millimeters, as measured from the entry surface of film 14, was found to provide a well-formed loop structure without overly stretching fibers in the remaining batt. Excessive penetration depth can draw loop-forming fibers from earlier-formed tufts, resulting in a less robust loop field. Penetration depths of 2 and 5 millimeters also worked in this example, although the 3.5 millimeter penetration is presently preferred. When needle 34 is retracted (FIG. 2D), the portions of the captured fibers 12 carried to the opposite side of the carrier web remain in the form of a plurality of individual loops 40 extending from a common trunk 42 trapped in film hole 38. As shown, residual stresses in the film 14 around the hole, acting to try to restore the film to its planar state, can apply a slight pressure to the fibers in the hole, helping to secure the base of the loop structure. The film can also help to resist tension applied to the fiber remaining on the batt side of the film that would tend to pull the loops back through the hole. The final loop formation preferably has an overall height "$H_L$" of about 0.040 to 0.060 inch (1.0 to 1.5 millimeters), for engagement with the size of male fastener elements commonly employed on disposable garments and such.

Referring back to FIG. 1, in some cases a wire screen is used in place of both bed of pins 20 and driven support belt 22, for an analogous loop formation process. FIGS. 3A through 3D sequentially illustrate needling fibers through a carrier film supported by a screen rather than pins. In these cross-sections, the screen is represented by two of the wires 35 comprising the screen. The wires 35 define openings through which the needle 34 passes as it draws fibers 12 through the film 14. Suitable screens can be made from materials including bronze, copper, brass, and stainless steel. We have found that screens made brass wire with a nominal diameter ('$W_D$') of between about 0.02 and 0.03 inch (0.5 and 0.8 millimeter) or, more preferably, between about 0.023 and 0.028 inch (0.6 and 0.7 millimeter), are resilient without being too stiff. Screens having openings with a nominal width ('$S_W$') of between about 0.05 and 0.2 inch (1.3 and 5.1 millimeter) or, more preferably, between about 0.06 and 0.1 inch (1.5 and 2.5 millimeter) are appropriate for this purpose. Such screens are available from McMaster-Carr Supply Co. of Elmhurst, Ill. under the designation 9223T41.

Referring next to FIG. 4, backing film 26 is a continuous sheet of polypropylene in this example, only about 0.001 inch (0.025 millimeter) thick. The backing sheet 26 is preferably weld-compatible with the carrier web (i.e., film 14), but need not be compatible with the material of fibers 12. For example, the material of the high-tenacity fibers may be selected to be of a resin with a higher melt temperature than either of the two films. After heat-rolling, the front and back films become permanently bonded together at discrete points 42 corresponding to the distal ends of pins 20. When a screen is used as the support bed, the front and back films become permanently bonded together in a cross-hatched grid mirroring the screen structure rather than at discrete points. Whether the welds are discrete points or an interconnected grid, this further secures fibers 12 that are trapped between the films, helping to strengthen the loop structures. The bonding of the two films occurs while the loop structures are safely disposed between pins 20, such that no pressure is applied to crush the loops during bonding.

Referring back to FIG. 1, in this example the surface of roll 28 is maintained at a temperature of between about 350 and 400 degrees Fahrenheit (177 and 260 degrees Celsius), and pressure of about 50 pounds per square inch (3.5 kilograms per square centimeter) was held between the roll and the backing film for about 5 seconds to achieve an appropriate bond. Roll 28 can have a compliant outer surface, or be in the form of belt. As an alternative to a heated roller, a flatbed fabric laminator can be employed to apply a controlled lamination pressure for a considerable dwell time. Such flatbed laminators are available from Glenro Inc. in Paterson, N.J. Either film may be preheated as necessary. For example, an infrared heater 44 may heat the backing film prior to spot lamination. In some applications, the finished loop product 30 is passed through a cooler (not shown) prior to spooling.

Pins 20 of pin bed 22 are arranged in an array of rows and columns, with a pin density of about 280 pins per square inch (45 pins per square centimeter), preferred to be between about 200 and 300 pins per square inch (31 to 47 pins per square centimeter). Pins 20 are each about 0.010 inch (0.25 millimeter) in diameter and about 0.25 inch (6.4 millimeters) long, and preferably straight to withstand the pressure required to laminating the backing material to the carrier web. In most cases, it is preferable that the pins not penetrate film 14 during bonding, but that each pin provide sufficient support to form a robust bond point between the layers. Instead of a continuous flexible belt as shown, a series of rigid pin cards can be used. In a non-continuous production method, such as for preparing discrete patches of loop material, a piece of film 14 and a section of fiber batt 12 may be layered upon a single card cloth, such as are employed for carding webs, for needling and subsequent bonding, prior to removal from the card cloth.

Figure 5:
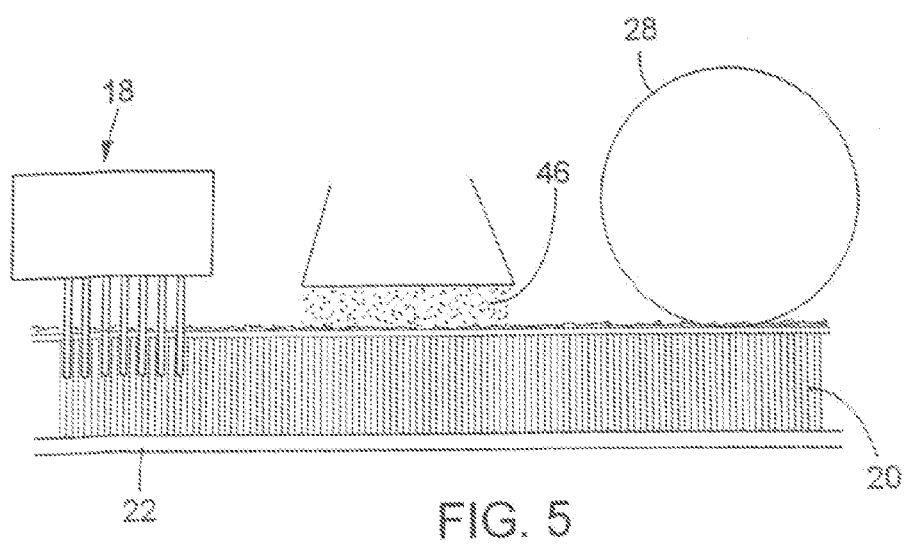
FIG. 5 shows a modified process employing a powdered binder instead of a backing sheet.
Figure 6:
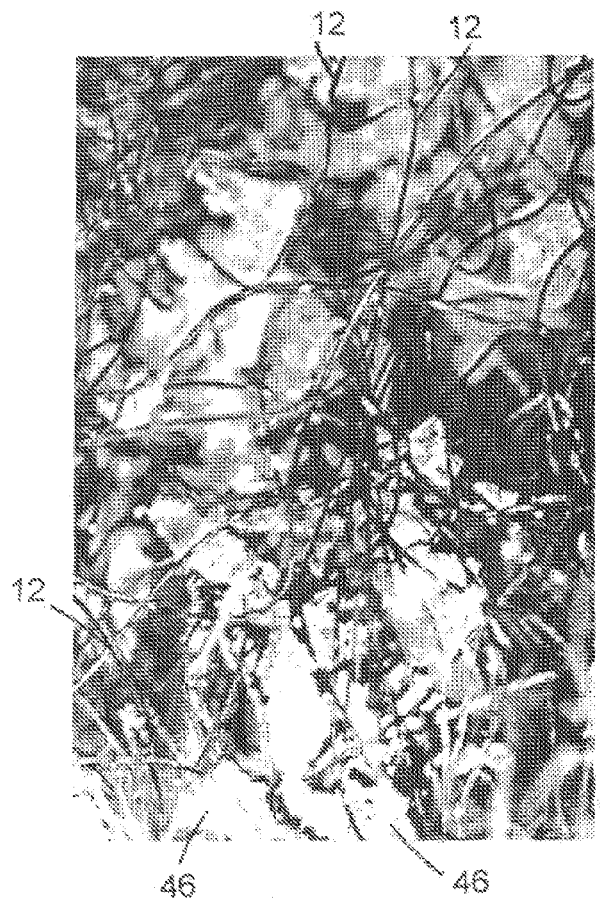
FIG. 6 is an enlarged photograph showing the powdered binder among fibers on the carrier web.

Referring next to FIG. 5, in another example a powdered binder 46 is deposited over the fiber side of the needle-punched film and then fused to the film by roll 28 or a flatbed laminator. For example, a polyethylene powder with a nominal particle size of about 20 microns can be sprinkled over the fiber-layered polyethylene film in a distribution of only about 0.5 ounces per square yard (17 grams per square meter). Such powder is available in either a ground, irregular shape or a generally spherical form from Equistar Chemicals LP in Houston, Tex. Preferably, the powder form and particle size are selected to enable the powder to sift into interstices between the fibers and contact the underlying film, as shown in the enlarged photograph of FIG. 6. It is also preferable, for many applications, that the powder be of a material with a lower melt temperature than the loop fibers, such that during bonding the fibers remain generally intact and the powder binder fuses to either the fibers or the carrier web. In either case, the powder acts to mechanically bind the fibers to the film in the vicinity of the supporting pins and anchor the loop structures. In sufficient quantity, powder 46 can also form at least a partial backing in the finished loop product, for permanently bonding the loop material onto a compatible substrate. Other powder materials, such as polypropylene or an EVA resin, may also be employed for this purpose, with appropriate carrier web materials, as can mixtures of different powders.

Figure 7:
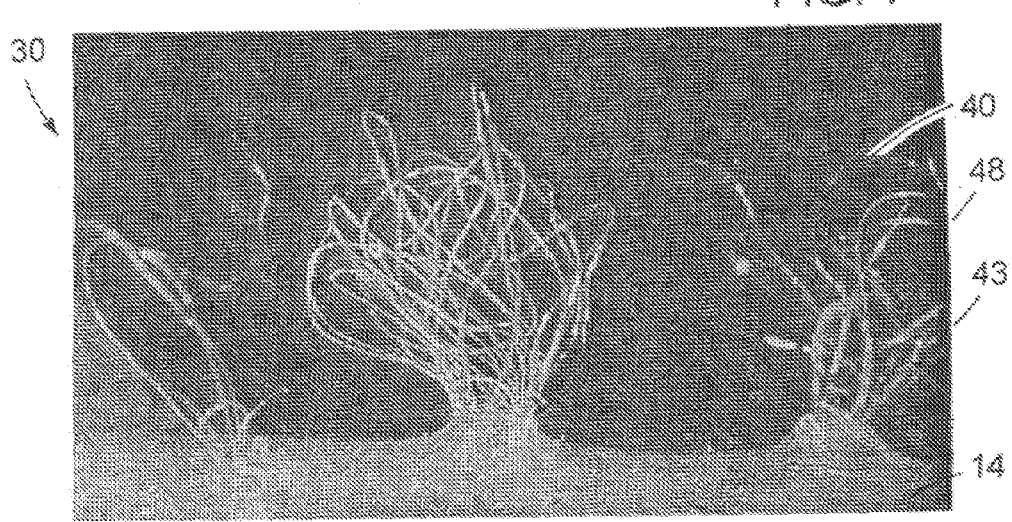
FIG. 7 is an enlarged photograph showing a loop structure.

FIG. 7 is an enlarged photograph of a loop structure 48 containing multiple loops 40 extending from a common trunk 43 through a hole in film 14, as formed by the above-described method. As shown, loops 40 stand proud of the underlying film, available for engagement with a mating hook product, due at least in part to the vertical stiffness of trunk 43 of each formation, which is provided both by the constriction of the film material about the hole and the anchoring of the fibers between the film and the backing layer. This vertical stiffness acts to resist permanent crushing or flattening of the loop structures, which can occur when the loop material is spooled or when the finished product to which the loop material is later joined is compressed for packaging. Resiliency of the trunk 43, especially at its juncture with the base, enables structures 48 that have been "toppled" by heavy crush loads to right themselves when the load is removed. As seen in this photograph, the various loops 40 of formation 48 extend to different heights from the film, which is also believed to promote fastener performance. Because each formation 48 is formed at a site of a penetration of film 14 during needling, the density and location of the individual structures are very controllable. Preferably, there is sufficient distance between adjacent structures so as to enable good penetration of the field of formations by a field of mating male fastener elements (not shown).

Referring to FIG. 8, the front carrier web 14, a proportion of the loop-forming fibers 12, and the backing 26 together form a stable mat 50 from which loop structures 48 project. Because of the relatively low amount of fibers remaining in the mat, together with the thinness of the front and back layers, mat 50 can have a thickness "$t_m$" of only about 0.008 inch (1.2 millimeters) or less, preferably less than about 0.005 inch, and even as low as about 0.001 inch (0.025 millimeter) in some cases. The front carrier film 14 has a thickness "$t_f$" of less than about 0.003 inch (0.08 millimeter), preferably less than about 0.002 inch (0.05 millimeter), and even more preferably less than about 0.001 inch (0.025 millimeter). The backing film 14 has a thickness "$t_b$" of less than about 0.003 inch (0.08 millimeter), preferably less than about 0.002 inch (0.05 millimeter), and more preferably less than about 0.0005 inch (0.01 millimeter). The finished loop product 30 has an overall thickness "T" of less than about 0.1 inch (2.5 millimeters), preferably less than about 0.05 inch (1.25 millimeters), and in some cases less than about 0.025 inch (0.6 millimeter). The overall weight of the loop fastener product, including carrier sheet, fibers and fused binder, is preferably less than about 15 ounces per square yard (500 grams per square meter). For some applications, the overall weight is less than about 10 ounces per square yard (333 grams per square meter), or even less than about 5 ounces per square yard (167 grams per square meter), or in some cases, even less than about 2.5 ounces per square yard (85 grams per square meter).

If the backing material 26 is selected to be liquid impermeable, then the entire loop product 30 can be formed to provide a barrier to liquids. If fibers 12 are selected to be absorbent, such as of cotton or cellulosic acetate, then the final loop product can be employed to wick liquids into the mat via the exposed loops 40.

Use of a transparent film 14 as the front carrier web enables graphic images 52 pre-printed on the rear backing layer to remain visible from the loop side of the finished loop product. The small bonding spots 42 between the film layers, and the low density of fiber remaining in the mat, are not found to significantly detract from the visibility of the image. This can be advantageous, for example, for loop materials to be used on children's products, such as disposable diapers. In such cases, child-friendly graphic images can be provided on the loop material that is permanently bonded across the front of the diaper chassis to form an engagement zone for the diaper tabs. The image can also be pre-printed on either surface of the carrier film 14.

Referring back to FIG. 1, in some cases the loop side of the bonded loop product is embossed with a desired embossing pattern prior to spooling. In this example the loop product is passed through a nip between a driven embossing roll 54 and a backup roll 56. The embossing roll has a pattern of raised areas that permanently crush the loop formations against the film, and may even melt a proportion of the fibers in those areas. Embossing may be employed simply to enhance the texture or aesthetic appeal of the final product.

Figure 9:
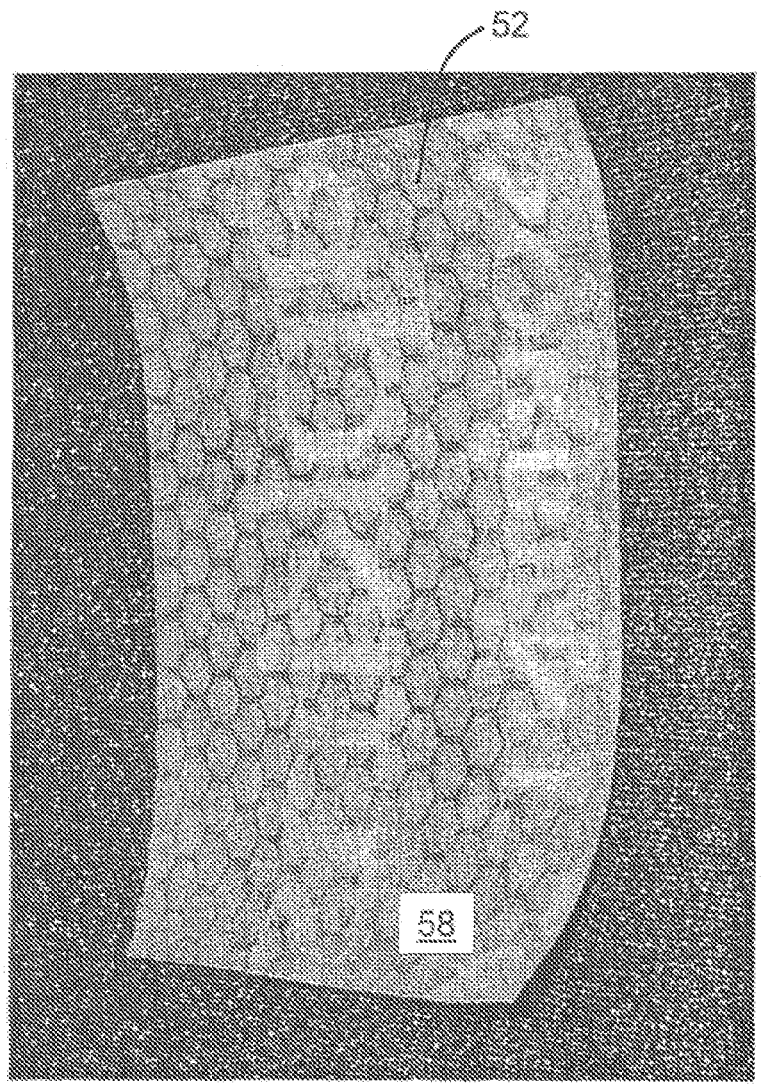
FIG. 9 is a perspective view showing an embossed loop surface.

FIG. 9 shows a finished loop product 30, as seen from the loop side, embossed with a honeycomb pattern 58. In this example, a graphic image 52 printed on the near side of the rear backing layer is clearly visible through the overlying materials. Various other embossing patterns include, as examples, a grid of intersecting lines forming squares or diamonds, or a pattern that crushes the loop formations other than in discrete regions of a desired shape, such as round pads of loops. The embossing pattern may also crush the loops to form a desired image, or text, on the loop material.

Figure 10:
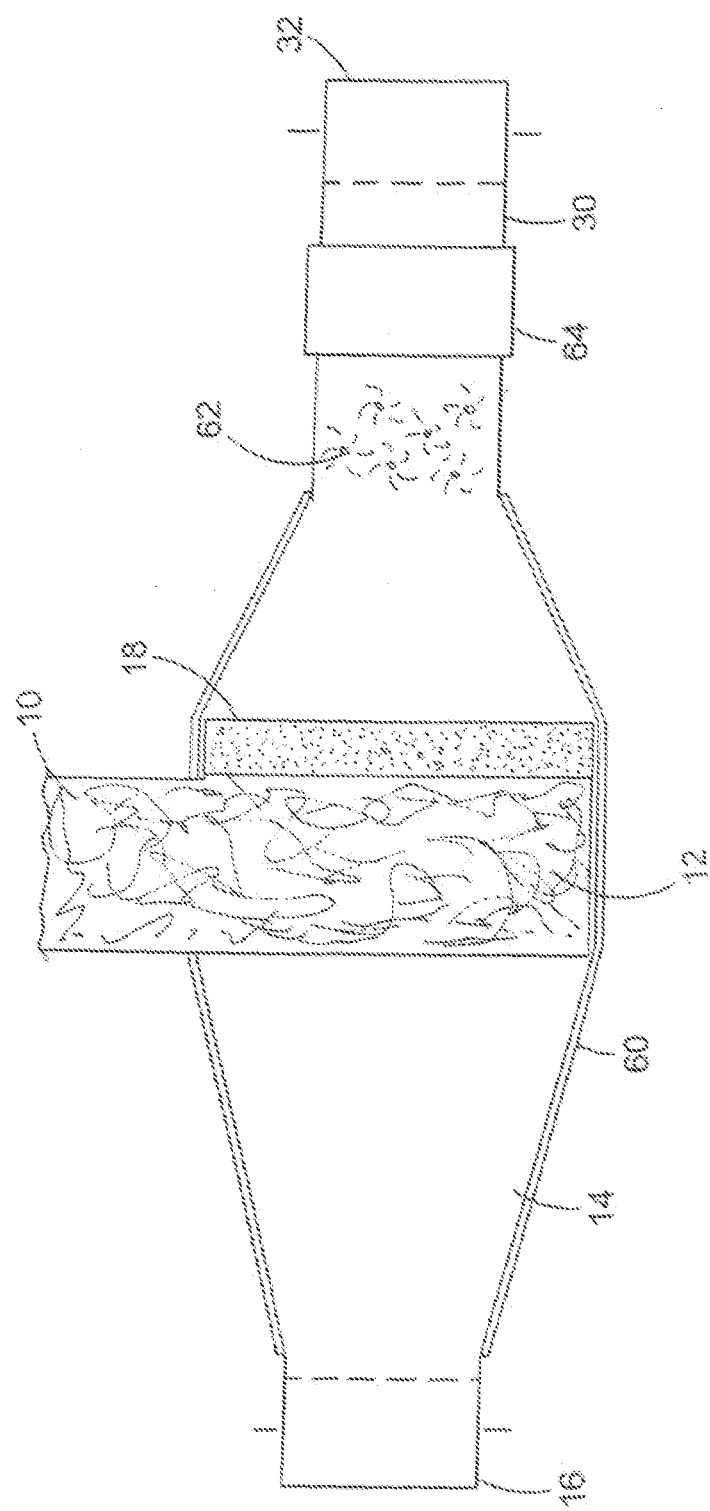
FIG. 10 is a top view of an apparatus and process for forming loops through a stretchable carrier web.

In some examples, the fibers are needled into a stretchable carrier web. Referring to FIG. 10, a laterally extensible film web 14 is spooled onto a tenter frame 60 that laterally stretches the web to at least about 110 percent of its original width. Fibers 12 are then applied to the stretched web, and the fiber-covered web is then needled before being relaxed to its original width. In this example, a liquid binder is sprayed onto the relaxed web by sprayers 62. The binder is then cured by being passed under an ultraviolet light source 64 before being spooled. An elastic binder may be employed, rendering the finished loop material stretchable. Alternatively, the binder may be applied and cured with the web in its stretched state, such that relaxing the web puckers the finished material. By needling web 14 in its stretched condition, the web can in some cases provide an even greater constriction about the trunks of the loop formations. Furthermore, the density of the loop structures can be greater in the final product than the needling density.

Figure 11:
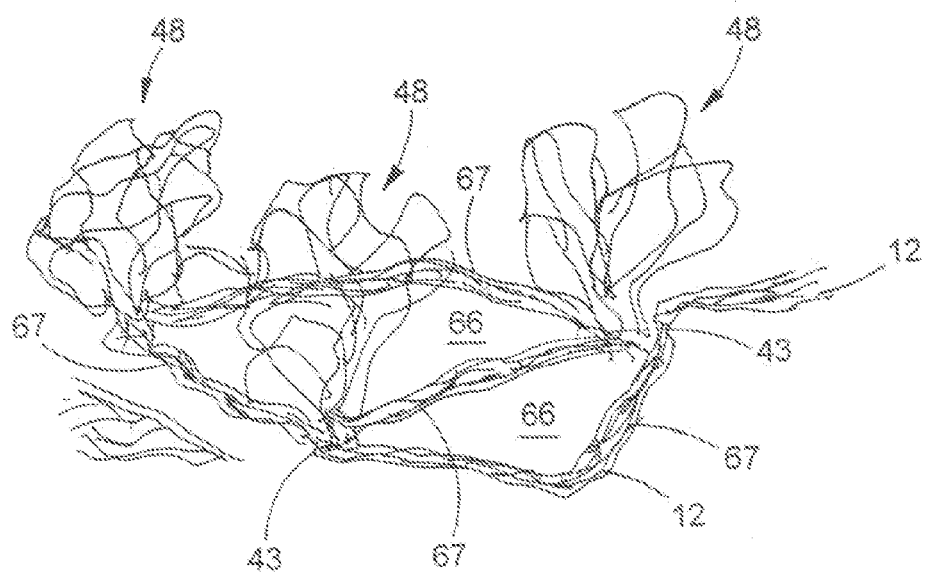
FIG. 11 is an enlarged perspective view of a loop product formed by needling the carrier film so as to disintegrate the film.

Referring back to FIG. 1, in some cases the needling parameters (e.g., needle size, needling density) can be selected to cause the carrier web 14 to be practically disintegrated during needling. While this is undesirable for some applications, we have found that such a structure is advantageous for other uses. For example, in one case a fiber-covered 0.002 inch (0.05 millimeter) polyethylene film was needled with 30 gauge forked needles to a penetration density of 250 penetrations per square centimeter, resulting in a structure as shown in FIG. 11, in which the fibers 12 themselves formed practically the only connectivity within the needled sheet. The film itself remained in the form of discrete portions 66 separated by cracks 67 extending between adjacent loop trunks 43. This structure was sufficiently dimensionally stable to be laminated to a stretchable backing film, such as a polypropylene or polyethylene film available from Tredegar Film Products in Richmond, Va. During lamination, the discrete segments 66 of carrier film bonded to the stretchable backing, further anchoring the bases of the loop structures while permitting the final loop product to be elastically stretchable within its plane.

Figure 12:
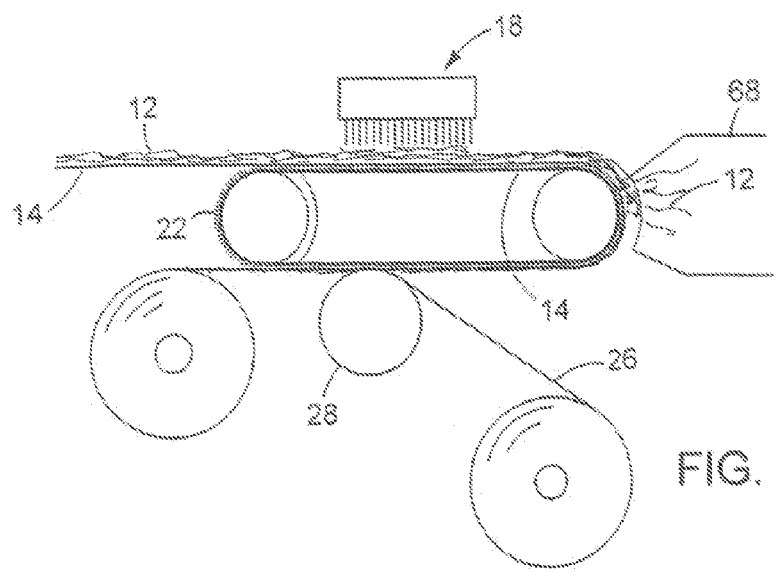
FIG. 12 shows a process for forming loops only in discrete regions of a carrier web.
Figure 13:
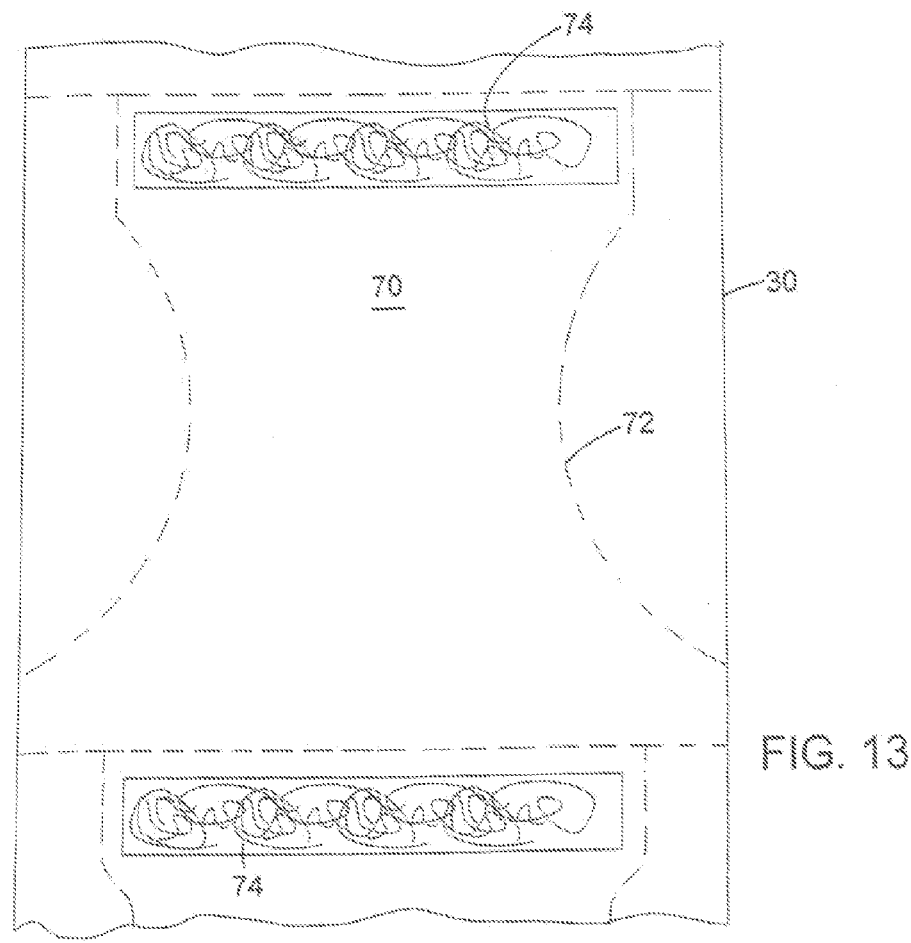
FIG. 13 is a top view of a sheet product formed by the process of FIG. 12, from which individual diaper covers may be die cut.

In another process, illustrated in FIG. 12, the fiber-covered carrier web is needled only in desired regions, leaving other areas of the web unpenetrated. The fibers in the non-needled regions remain generally loose and are readily removed from the carrier web, such as by vacuum 68. Removed fibers are readily re-carded and thus recycled. The carrier web 14 is then laminated to backing web 26, fusing to the carrier web in the fiber-covered and needled regions as well as in the fiber-free regions. The laminate product is then spooled for later use. In this manner, a material having loops only in desired regions may be manufactured. Such a product has utility, for example, as a continuous sheet product from which outer diaper covers may be die cut, as shown in FIG. 13. Each diaper body cover 70 is cut at dotted lines 72 to incorporate a discrete loop patch 74 where the fiber-covered film had been needled. Pre-printed graphics (not shown) on the backing film are indexed to the loop patch 74 and the die cutter and are visible through both the loop-bearing and loop-free regions of the carrier web.

Figure 14:
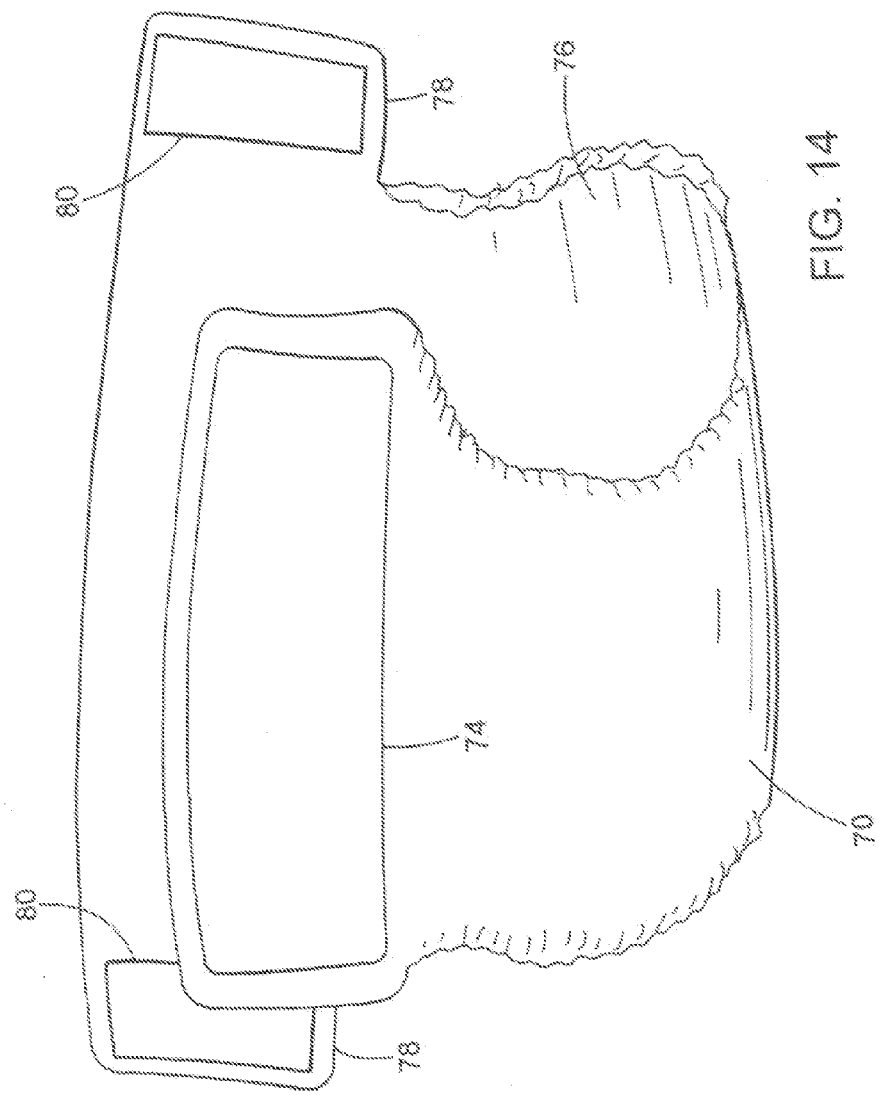
FIG. 14 is a perspective view of a disposable diaper having a diaper cover cut from the product of FIG. 13.

The die cut diaper cover 70 is formed into a disposable diaper as shown in FIG. 14, with the cover and an inner, porous film 76 sandwiching an absorbent core (not shown), and the loop patch 70 positioned to receive mating diaper tabs 78 carrying patches 80 of male fastener elements, to releasably secure the diaper about an infant. Because the loop structures are formed through the material forming the outer cover of the diaper, there is no risk of the loop material delaminating or otherwise undesirably separating from the diaper chassis.

Figure 15:
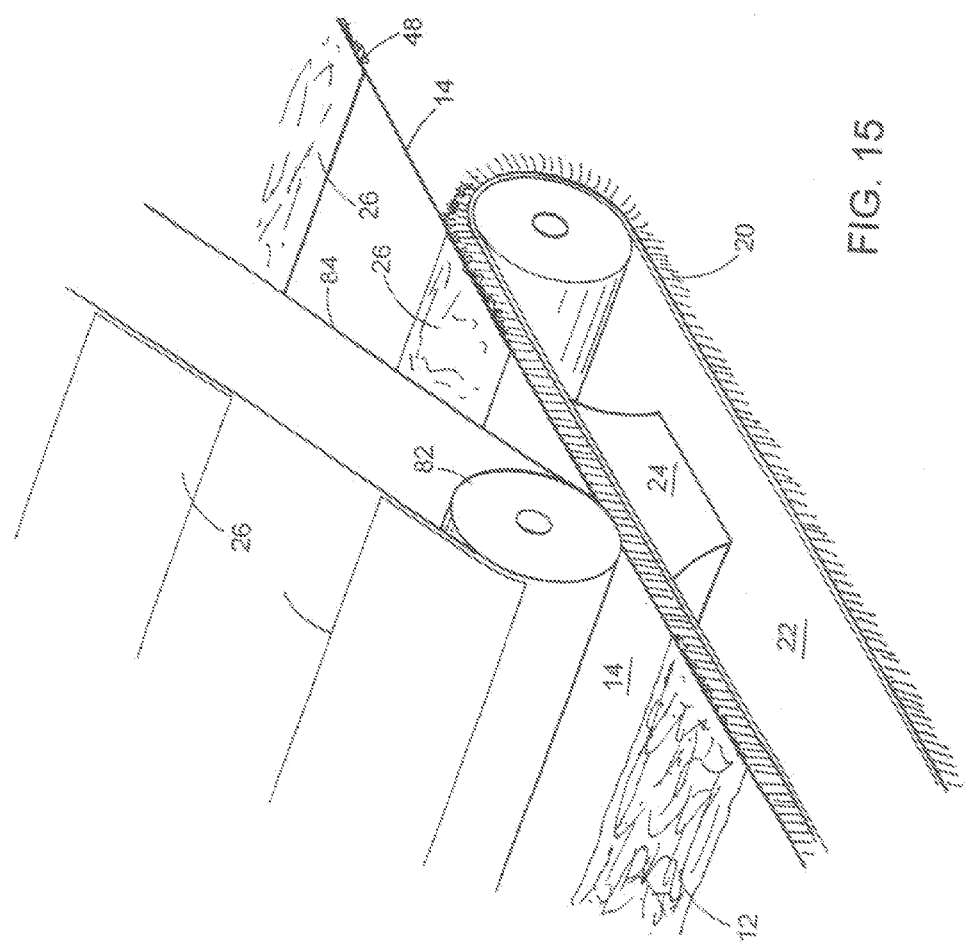
FIG. 15 is a perspective view of a process for applying discrete backing patches to the needled regions of the carrier web.

In another bonding process illustrated in FIG. 15, discrete patches of backing 26 are applied to cover the needled and fiber-bearing regions of carrier web 14, leaving the remaining regions of the carrier web uncovered and unlaminated. Each backing patch 26 is bonded in place by pressure from roller 82 to cover the fibers remaining on the back surface of the carrier web. Fluid impermeable patches 26 can be employed to seal the needled holes, thereby creating a fluid-impermeable finished product of particularly low weight and nominal thickness. In some cases, backing patches 26 are pre-coated with an adhesive that adheres the backing to the film and bonds the fibers. Patches 26 can be delivered to carrier 14 on a circulating conveyor belt 84 in a labeling process, as shown.

Figure 16:
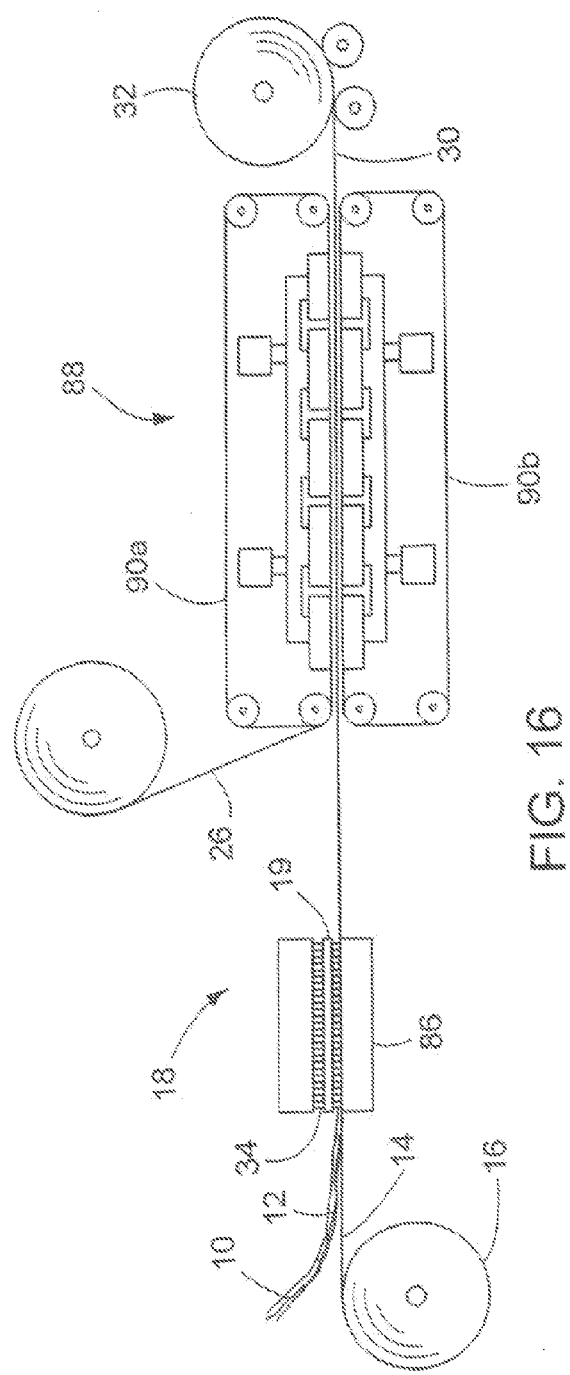
FIG. 16 illustrates a needling and bonding process with a flatbed laminator.

Referring to FIG. 16, in another example the needling station 18 includes a stationary stitching plate 86 having a flat upper surface defining an array of holes into which needles 34 extend after penetrating carrier 14. Stripper plate 19 keeps the needled product from following the needles as they retract. After needling, the product is stable enough to either be spooled for later bonding, or to move directly from the needling station into a bonding station, such as flatbed laminator 88. Laminator 88 has upper and lower moving conveyor belts 90*a* and 90*b* that travel with the needled carrier and backing material 26 between a series of opposed, pneumatically controlled pressure plates that apply a controlled heat and pressure to the materials to affect bonding. One of the laminator belts may be equipped with an array of protrusions, ridges or pins for discrete spot bonding and/or embossing, if so desired.

The above-described processes enable the cost-effective production of high volumes of loop materials with good fastening characteristics. They can also be employed to produce loop materials in which the materials of the loops and backing are individually selected for optimal qualities. For example, the loop fiber material can be selected to have high tenacity for fastening strength, while the backing material can be selected to be readily bonded to other materials without harming the loop fibers.

The materials of the loop product can also be selected for other desired properties. In one case the loop fibers, carrier web and backing are all formed of polypropylene, making the finished loop product readily recyclable. In another example, the loop fibers, carrier web and backing are all of a biodegradable material, such that the finished loop product is more environmentally friendly. High tenacity fibers of biodegradable polylactic acid are available, for example, from Cargill Dow LLC under the trade name NATUREWORKS. In another example, carbon fibers are needle-punched into a KEVLAR film and bonded with silicone or other high temperature adhesive to produce a loop material with excellent fire resistance.

For many applications, the fibers can be of polyester, polyethylene, polypropylene, nylon or a co-polymer of two or more resins. Staple fibers of a high tenacity, high melt temperature resin may be mixed with fibers of a lower melt temperature resin that melts during bonding to further anchor the loops formed of the high tenacity fibers. Fibers with a high tenacity core sheathed with a low melt temperature resin may be employed in some cases.

The carrier web can be a solid sheet, such as a sheet of film that is not porous prior to needling. In some other cases, a non-woven, woven or knit material may serve as the carrier web. Suitable films include polyesters, polyethylenes, polypropylenes, nylons and their copolymers. Paper may also be employed, and may be pre-pasted with an adhesive on the fiber side to help bond the fibers and/or a backing layer to the paper.

Polymer backing layers or binders may be selected from among suitable polyethylenes, polyesters, EVA, polypropylenes, and their co-polymers. Paper, fabric or even metal may be used. The binder may be applied in liquid or powder form, and may even be pre-coated on the fiber side of the carrier web before the fibers are applied. In some cases, a separate binder or backing layer may not be required, such as for very low cycle applications.

In one test, 3 denier crimped polyester fibers were carded and laid over an 0.002 inch (0.05 millimeter) thick sheet of blown polyethylene film in a batt having a basis weight of about 1.0 ounce per square yard (33 grams per square meter). The fiber-covered film was then needled with 38 gauge tufting needles, from the fiber side, at a needling density of 250 punches per square centimeter, and a penetration depth of 3.3 millimeters. The back of the needled material was bonded to a 0.001 inch (0.025 millimeter) thick sheet of polyethylene against pins of the density and diameter described above. Mated with a molded hook product with CFM-29 hooks in a density of about 264 hooks per square centimeter, available from Velcro USA in Manchester, N.H., the loops achieved an average peel of about 500 grams per inch (200 grams per centimeter), as tested according to ASTM D 5170-91. Mated with this same hook product, the loop material achieved an average shear of about 7,000 grams per square inch (1100 grams per square centimeter), as tested according to ASTM D 5169-91. This roughly compares to an average peel of about 215 grams per inch (86 grams per centimeter) and an average shear of about 3,100 grams per square inch (500 grams per square centimeter) against the same hook tape for a point-unbonded non-woven loop material widely used in disposable diapers. Tested against a CFM-85 palm tree hook from Velcro USA, the loop material achieved roughly 600 grams per inch (240 grams per centimeter) of peel and 6,000 grams per square inch (930 grams per square centimeter) of shear, compared to about 300 grams per inch (118 grams per centimeter) of peel and 3,000 grams per square inch (465 grams per square centimeter) of shear for the point-unbonded non-woven.

In another example, a loop product was prepared as in the test just described, except that the fibers were 6 denier, the needling density was 225 punches per square centimeter, and the needling depth was 4.4 centimeters. This loop material achieved roughly 550 grams per inch (215 grams per centimeter) of peel and 5,000 grams per square inch (775 grams per square centimeter) of shear against the CFM-29 hook product, and roughly 270 grams per inch (105 grams per centimeter) of peel and 5,500 grams per square inch (850 grams per square centimeter) of shear against the CFM-85 hook product.

A number of embodiments of the invention have been described. Nevertheless, it will be understood that various modifications may be made without departing from the spirit and scope of the invention. Accordingly, other embodiments are within the scope of the following claims.

What is claimed is:

1. A method of making a loop fastener product, the method comprising
   placing a layer of fibers against a first side of a carrier sheet of film, the layer of fibers having an overall density of less than about 5 ounces per square yard and the carrier sheet having an overall thickness of less than about 0.005 inch;
   needling fibers of the layer through the carrier sheet by piercing the carrier sheet with forked needles that drag portions of the fibers through holes formed in the carrier sheet during needling, leaving loops of the fibers extending from the holes on a second side of the carrier sheet; and
   fusing the fibers to the first side of the carrier sheet to anchor bases of the loops;
   wherein the carrier sheet forms projections extending out of a general plane of the carrier sheet at the holes, the projections bearing against fibers passing through the holes.

2. The method of claim 1 wherein the needles pierce the carrier sheet to a needling density of at least 250 piercings per square centimeter.

3. The method of claim 1 wherein the fiber density is less than about 1.5 ounces per square yard (66 grams per square meter).

4. The method of claim 1 wherein the carrier sheet has a nominal thickness of less than about 0.002 inch (0.05 millimeter).

5. The method of claim 1 wherein the fibers have an average staple length less than about 6 inches (15 centimeters).

6. The method of claim 1 wherein the fibers have a nominal tenacity of at least 3.0 grams per denier.

7. The method of claim 1 wherein the fibers are of between about 2 and 10 denier.

8. The method of claim 1 wherein the carrier sheet is pre-printed with graphics that remain visible from the second side of the carrier sheet after fusing.

9. The method of claim 1 further comprising embossing the second side of the carrier sheet, after fusing, to impart a desired pattern to the loops.

10. The method of claim 9 wherein the pattern comprises raised beds of loops surrounded by regions of crushed fibers.

11. The method of claim 1 wherein the carrier sheet and fibers consist essentially of a single recyclable base resin.

12. The method of claim 1 wherein the needles are of 25 gauge or smaller diameter.

13. The method of claim 1 wherein the needles pierce the carrier sheet from the first side of the carrier sheet.

14. The method of claim 1 wherein the needles penetrate the carrier sheet to a penetration distance of between about 2 and 8 millimeters, measured from an entrance side of the sheet.

15. The method of claim 1 wherein needling density and penetration distances are selected to provide a textured pattern to the loops.

16. The method of claim 1 wherein the carrier sheet is needled only in selected regions, with other regions of the carrier sheet not needled, to form loops only in the selected regions.

17. The method of claim 16 wherein more fibers are placed against the carrier sheet of film in the selected regions than in the other regions.

18. The method of claim 16 further comprising, after needling, removing fibers from the other regions.

19. The method of claim 16 wherein a binder is applied only to the selected regions of the carrier sheet.

20. The method of claim 1 further comprising placing a binder comprising a sheet of film on the fibers on the first side of the pierced film and fusing the binder to the pierced film.

21. The method of claim 20 wherein the binder is pre-printed with graphics that remain visible from the second side of the carrier sheet after fusing.

22. The method of claim 20 wherein the sheet of film comprises a resin more weld-compatible than resin of the fibers with resin of the carrier sheet.

23. The method of claim 20 wherein the sheet of film has a nominal thickness of less than about 0.003 inch (0.08 millimeter).

24. The method of claim 20 further comprising preheating the sheet of film before placing the sheet of film on the fibers.

25. The method of claim 1 wherein the loop fastener product has an overall weight of less than about 15 ounces per square yard (500 grams per square meter).

26. The method of claim 1 wherein the fastener product has an overall thickness of less than about 0.1 inch (2.5 millimeters).

27. The method of claim 1 wherein the carrier sheet comprises a stretchable resin film.

28. The method of claim 27 wherein the carrier sheet is needled in a stretched state and then relaxed to densify the loops.

29. The method of claim 27 further comprising placing a binder comprising a second sheet of stretchable resin film on the fibers on the first side of the pierced film and fusing the binder to the pierced film.

30. The method of claim 1 further comprising placing a binder in powder form on the fibers on the first side of the pierced carrier sheet and fusing the binder to the pierced carrier sheet.

31. The method of claim 1 wherein the needling sufficiently perforates the carrier sheet that the carrier sheet becomes distendable; and wherein the fibers are fused to the carrier sheet by a binder that comprises a stretchable material, thereby forming a stretchable loop fastener product.

32. The method of claim 31 wherein, after needling and before fusing, material of the carrier sheet forms generally discrete regions separated by cracks extending between holes punched through the carrier sheet by the needling.

33. A method of making a loop fastener product, the method comprising
   placing a layer of fibers against a first side of a carrier sheet of film;
   needling fibers of the layer through the carrier sheet by piercing the sheet with forked needles that drag portions of the fibers through holes formed in the sheet during needling, leaving loops of the fibers extending from the holes on a second side of the carrier sheet;
   placing a particulate-form binder on the fibers on the first side of the pierced sheet, particles of the binder entering interstices defined between adjacent fibers near the holes in the carrier sheet; and then
   fusing the binder to the carrier sheet to anchor bases of the loops wherein the carrier sheet forms projections extending out of a general plane of the carrier sheet at the holes, the projections bearing against fibers passing through the holes.

34. The method of claim 33 wherein the binder is in the form of a dry powder.

35. The method of claim 33 wherein the binder has a nominal particulate size of less than about 20 microns.

36. The method of claim 33 wherein the binder is placed on the pierced sheet in a distribution of less than about two ounces per square yard (66 grams per square meter).

37. The method of claim 33 wherein fusing the binder comprises applying heat and pressure to the first side of the pierced sheet.

38. The method of claim 37 wherein the pressure is applied by a rotating roller.

39. The method of claim 37 wherein the pressure is applied by a flatbed laminator.

40. A method of making a loop fastener product, the method comprising
   placing a layer of fibers against a first side of a carrier sheet of film;
   with a second side of the carrier sheet against a support bed, needling fibers of the layer through the carrier sheet by piercing the sheet with forked needles that drag portions of the fibers through holes formed in the sheet during needling, leaving loops of the fibers extending from the holes into the support bed on a second side of the carrier sheet, wherein the carrier sheet forms projections extending out of a general plane of the carrier sheet at the holes, the projections bearing against fibers passing through the holes;
   placing a binder on the fibers on the first side of the pierced sheet; and,
   with the loops extending into the support bed, applying pressure to the first side of the pierced sheet to fuse the binder to the carrier sheet in regions supported by the support bed.

41. The method of claim 40 wherein the support bed comprises a bed of pins, distal ends of the pins contacting the second side of the carrier sheet and the loops extending between adjacent pins.

42. The method of claim 41 wherein the pins are arranged with a pin density of at least about 150 pins per square inch (23 pins per square centimeter).

43. The method of claim 40 wherein the support bed comprises a stitching plate defining holes aligned with the needles.

44. The method of claim 40 wherein the pressure is applied by a heated surface placed against the binder on the first side of the carrier sheet.

45. The method of claim 44 wherein the heated surface is a peripheral surface of a rotating roller.

46. The method of claim 44 wherein the heated surface is maintained at a temperature high enough, and is held against the binder long enough, to cause the binder to melt in the regions supported by the support bed, without significantly melting resin of the fibers.

47. The method of claim 40 wherein the support bed comprises a screen, the screen contacting the second side of the carrier sheet and the loops extending through openings in the screen.

48. The method of claim 47 wherein the screen comprises wire defining the openings.

49. The method of claim 48 wherein the screen comprises wire of a nominal diameter of between about 0.02 and 0.03 inch (0.5 and 0.8 millimeter).

50. The method of claim 47 wherein the openings have a nominal width of between about 0.05 and 0.2 inch (1.3 and 5.1 millimeter).

51. The method of claim 47 wherein the pressure is applied by a heated surface placed against the binder on the first side of the carrier sheet.

52. The method of claim 51 wherein the heated surface is a peripheral surface of a rotating roller.

53. The method of claim 51 wherein the heated surface is maintained at a temperature high enough, and is held against the binder long enough, to cause the binder to melt in the regions supported by the support bed, without significantly melting resin of the fibers.

54. A method of making a lightweight loop fastener product, the method comprising
   placing a layer of fibers against a first side of a carrier sheet of film, the fibers being of between about 2 and 10 denier;
   needling fibers of the layer through the carrier sheet by piercing the sheet with forked needles that drag portions of the fibers through holes formed in the sheet during needling, leaving loops of the fibers extending from the holes on a second side of the carrier sheet, the needles penetrating to a maximum distance of less than about 7.0 millimeters from the first side of the carrier sheet and being of a diameter of less than about 0.036 inch (0.9 millimeter), wherein the carrier sheet forms projections extending out of a general plane of the carrier sheet at the holes, the projections bearing against fibers passing through the holes; and fusing the fibers to the carrier sheet to anchor bases of the loops.

55. The method of claim 54 wherein the needles pierce the carrier sheet to a needling density of at least 200 piercings per square centimeter.

56. The method of claim 54 wherein the fibers have an overall density of less than about 3 ounces per square yard (100 grams per square meter).

57. The method of claim 56 wherein the overall fiber density is less than about 1.5 ounces per square yard (66 grams per square meter).

58. The method of claim 54 wherein the carrier sheet has a nominal thickness of less than about 0.003 inch (0.08 millimeter).

59. The method of claim 58 wherein the nominal thickness is less than about 0.002 inch (0.05 millimeter).

60. The method of claim 54 wherein the fibers have a nominal tenacity of at least 3.0 grams per denier.

61. The method of claim 54 wherein the fibers are of between about 3 and 6 denier.

62. The method of claim 54 wherein the needles penetrate to a maximum distance of between about 3 and 4 millimeters from the first side of the carrier sheet.

63. The method of claim 54 further comprising placing a binder comprising a sheet of film on the fibers on the first side of the pierced carrier sheet and fusing the binder to the pierced carrier sheet.

64. The method of claim 63 wherein the binder is pre-printed with graphics that remain visible from the second side of the carrier sheet after fusing.

65. The method of claim 63 wherein the sheet of film has an overall thickness of less than about 0.003 inch (0.08 millimeter).

66. The method of claim 63 further comprising preheating the sheet of film before placing the binder on the fibers.

67. The method of claim 54 wherein the loop fastener product has an overall weight of less than about 15 ounces per square yard (500 grams per square meter).

68. The method of claim 54 wherein the fastener product has an overall thickness of less than about 0.1 inch (2.5 millimeters).

69. The method of claim 63 wherein the fused binder and earner sheet together form a base sheet of the fastener product from which the loops extend, the base sheet having an overall thickness of less than about 0.005 inch (0.13 millimeter).

70. A method of providing hook-engageable loops in selected regions on a carrier sheet, the method comprising placing a layer of fibers against a first side of a carrier sheet of film;

needling fibers of the layer through the carrier sheet in selected regions by piercing the sheet with forked needles that drag portions of the fibers through holes formed in the selected regions of the sheet during needling, leaving loops of the fibers extending from the holes on a second side of the carrier sheet wherein the carrier sheet forms projections extending out of a general plane of the carrier sheet at the holes, the projections bearing against fibers passing through the holes;

placing a binder on the fibers on the first side of the pierced sheet in the selected regions; and fusing the binder to the carrier sheet to anchor bases of the loops.

71. The method of claim 70 wherein the binder is in the form of a liquid-impermeable sheet that covers the fibers and holes to form a barrier to liquid passing through the holes formed in the carrier sheet by the needling.

72. The method of claim 71 wherein the liquid-impermeable sheet is in the form of discrete sheet portions placed against the selected regions, with the other regions not covered by the binder.

73. The method of claim 71 wherein the binder is pre-printed with graphics that remain visible from the second side of the carrier sheet after fusing.

74. The method of claim 70 wherein the binder has an overall thickness of less than about 0.003 inch (0.08 millimeter).

75. The method of claim 70 wherein the binder is in the form of a dry powder.

76. The method of claim 70 wherein the binder is in liquid form.

77. The method of claim 70 wherein the carrier sheet is needled while a second side of the carrier sheet against a support bed, and wherein the binder is placed on the carrier sheet with the loops extending from the holes into the support bed.

78. The method of claim 70 further comprising, after fusing, severing the carrier sheet to form discrete sheet products, each sheet product having at least one region with loops and another region free of loops.

79. The method of claim 78 further comprising forming the discrete sheet portions into outer layers of disposable garments, the region with loops arranged to be releasably engaged by male touch fastener elements for securing the garment about a wearer.

80. The method of claim 79 wherein the disposable garment comprises a diaper.

81. A method of making a loop fastener product, the method comprising placing a layer of fibers against a first side of a carrier sheet of film, the layer of fibers having an overall density of less than about 5 ounces per square yard and the film having an overall thickness of less than about 0.005 inch;

needling fibers of the layer through the film by piercing the film with forked needles that drag portions of the fibers through holes formed in the film during needling, leaving loops of the fibers extending from the holes on a second side of the carrier sheet, wherein the carrier sheet forms projections extending out of a general plane of the carrier sheet at the holes, the projections bearing against fibers passing through the holes;

fusing the fibers to the film to anchor bases of the loops; and embossing the second side of the carrier sheet to impart a desired pattern to the loop surface.

82. The method of claim 81 wherein the pattern comprises raised beds of loops surrounded by regions of crushed fibers.

83. A method of making a loop fastener product, the method comprising placing a layer of fibers against a first side of a carrier sheet of film, the layer of fibers having an overall density of less than about 5 ounces per square yard and the film having an overall thickness of less than about 0.005 inch;

needling fibers of the layer through the film by piercing the film with forked needles that drag portions of the fibers through holes formed in the film during needling, leaving loops of the fibers extending from the holes on a second side of the carrier sheet, wherein the carrier sheet forms projections extending out of a general plane of the carrier sheet at the holes, the projections bearing against fibers passing through the holes; and fusing the fibers to the film to anchor bases of the loops;

wherein the loop fastener product has an overall weight of less than about 15 ounces per square yard (500 grams per square meter).

84. The method of claim 83 wherein the overall weight is less than about 10 ounces per square yard (330 grams per square meter).

85. The method of claim 83 wherein the overall weight is less than about 5 ounces per square yard (160 grams per square meter).

86. The method of claim 1 wherein the fibers include first fibers having a first melting temperature and second fibers having a second melting temperature, the second melting temperature being lower than the first melting temperature.

87. The method of claim 86 wherein the first fibers are mixed with the second fibers.

88. The method of claim 87 wherein fusing the fibers comprises melting the second fibers.

89. The method of claim 1 wherein each of the fibers comprises a core in a resin sheath.

90. The method of claim 89 wherein a first melting point of the cores is higher than a second melting point of the resin sheaths.

91. The method of claim 90 wherein fusing the fibers comprises melting the resin sheaths.

92. The method of claim 1 wherein the needles pierce the carrier sheet to a needling density of at least 200 piercings per square centimeter.

\* \* \* \* \*

UNITED STATES PATENT AND TRADEMARK OFFICE
CERTIFICATE OF CORRECTION

PATENT NO.         : 7,156,937 B2                                              Page 1 of 1
APPLICATION NO.    : 10/728138
DATED              : January 2, 2007
INVENTOR(S)        : George A. Provost It is certified that error appears in the above-identified patent and that said Letters Patent is hereby corrected as shown below:

Column 21, Claim 69, Line 52;

Delete "earner" and Insert --carrier--

Signed and Sealed this

Third Day of March, 2009

JOHN DOLL
*Acting Director of the United States Patent and Trademark Office*